(12) United States Patent
Nagao

(10) Patent No.: US 6,267,008 B1
(45) Date of Patent: Jul. 31, 2001

(54) ANGULAR RATE DETECTING DEVICE

(75) Inventor: Masaru Nagao, Ama-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/420,464

(22) Filed: Oct. 19, 1999

(30) Foreign Application Priority Data

Oct. 23, 1998 (JP) .................................. 10-302656
Jun. 7, 1999 (JP) .................................. 11-160135

(51) Int. Cl.[7] .................................................. G01C 19/00
(52) U.S. Cl. ........................................................ 73/504.12
(58) Field of Search ......................... 73/504.12, 504.16, 73/504.02, 504.03, 504.04

(56) References Cited

FOREIGN PATENT DOCUMENTS

| HEI 4-233468 | 8/1992 | (JP) . |
|---|---|---|
| HEI 4-242114 | 8/1992 | (JP) . |
| HEI 5-312576 | 5/1993 | (JP) . |
| HEI 5-248872 | 9/1993 | (JP) . |
| HEI 5-248874 | 9/1993 | (JP) . |
| HEI 6-288773 | 10/1994 | (JP) . |
| HEI 8-54242 | 2/1996 | (JP) . |
| HEI 8-114456 | 5/1996 | (JP) . |
| HEI 8-159776 | 6/1996 | (JP) . |
| HEI 8-247767 | 9/1996 | (JP) . |

(List continued on next page.)

OTHER PUBLICATIONS

Clark et al., *Surface Micromachined Z–Axis Vibratory Rate Gyroscope*, pp. 283–287, Solid State Sensor and Actuator Workshop, Jun. 2–6, 1996.

Kawai et al., *Vibratory Rate Gyroscope with Lateral Movement for Driving and Sensing Using SOI Substrate*, pp. 37–40, Sensor Symposium, 1998.

Park et al., *Literally Oscillated and Force–Balanced Micro Vibratory Rate Gyroscope Supported by Fish Hook Shape Springs*, pp. 494–499, IEEE 1997.

Baek et al., *A Symmetrical Z–Axis Gyroscope With a High Aspect Ratio Using Simple and New Process*, pp. 612–617, IEEE 1999.

Mochida et al., *A Micromachined Vibrating Rate Gyroscope With Independent Beams for the Drive and Detection Modes*, p. 618–623.

Geiger et al., *New Designs of Micromachined Vibrating Rate Gyroscopes With Decoupled Oscillation modes*, pp. 1129–1132, IEEE 1997.

(List continued on next page.)

*Primary Examiner*—Richard A. Moller
(74) *Attorney, Agent, or Firm*—Kenyon & Kenyon

(57) ABSTRACT

An oscillator 20 and main frames 30-1 and 30-2, coupled to one another by beams 33-1 through 33-4, float above the upper face of a substrate 10. The main frames 30-1 and 30-2 are divided into a plurality of sections along a Y-axis. Drive electrode portions 51-1 through 51-4 drive the main frames 30-1 and 30-2 and the oscillator 20 in the direction of an X-axis. Due to an angular rate around a Z-axis perpendicular to the X and Y axes, the oscillator 20 oscillates in the direction of the Y-axis. The oscillation in the direction of the Y-axis is measured using a high-frequency signal applied to detection electrode portions 53-1 through 53-4, whereby the angular rate is detected. The main frame 30-1 is provided with drive electrode portions 51-1 and 51-2, while the main frame 30-2 is provided with drive electrode portions 51-3 and 51-4. Drive signals independent from one another are supplied to the drive electrode portions 51-1 through 51-4, whereby the main frames 30-1 and 30-2 are caused to oscillate precisely in the direction of the X-axis.

32 Claims, 14 Drawing Sheets

FOREIGN PATENT DOCUMENTS

| | | |
|---|---|---|
| HEI 9-42973 | 2/1997 | (JP) . |
| HEI 9-119942 | 5/1997 | (JP) . |
| HEI 9-127148 | 5/1997 | (JP) . |
| HEI 9-178493 | 7/1997 | (JP) . |
| HEI 10-103960 | 4/1998 | (JP) . |

OTHER PUBLICATIONS

Kobayashi et al., *Double–Frame Silicon Gyroscope Packaged Under Low Pressure by Wafer Bonding*, pp. 910–913, Transducers, Jun. 7–10, 1999.

Park et al., *Lateral Gyroscope Suspended by Two Gimbals Through High Aspect Ratio ICP Etching*, pp. 972–975, Transducers, Jun. 7–10, 1999.

Schumacher et al., *Micromechanical LIGA–Gyroscope*, pp. 1574–1577, Transducers, Jun. 7–10, 1999.

ANGULAR RATE DETECTING DEVICE

INCORPORATION BY REFERENCE

The disclosure of Japanese Patent Application No. HEI 10-302656 filed on Oct. 23, 1998 including the specification, drawings and abstract thereof is incorporated herein by reference in its entirety.

BACKGROUND OF THE INVENTION

1. Field of the Invention

The present invention relates to an angular rate detecting device for detecting angular rate of an object using a Coriolis force.

2. Description of the Related Art

Devices related to the present invention are disclosed, for example, in Technical Digest of the 16th Symposium, 1988, pp. 37–40, Japanese Patent Publication Laid-Open No. HEI 10-103960, and Transducer of IEEE, 1997, pp. 1129–1132. An angular rate detecting device as described in these publications is composed of an oscillation portion connected to a substrate via a supporting member and oscillatable over the substrate in directions of mutually perpendicular X and Y axes, a drive portion on the substrate causing the oscillation portion to oscillate in the direction of the X-axis, and a detection portion on the substrate detecting oscillation of the oscillation portion in the direction of the Y-axis. Based on oscillation of the oscillation portion in the direction of the Y-axis, the angular rate detecting device detects an angular rate effective around a Z-axis which is perpendicular to both the X-axis and the Y-axis, with the oscillation portion oscillating in the direction of the X-axis.

The Transducer of IEEE publication discloses an oscillation portion composed of a rectangular frame and an oscillator. The frame is connected to the substrate through drive beams serving as supporting members so that the frame can oscillate in the direction of the X-axis. The oscillator is disposed within the frame over the substrate, and connected through detection beams serving as supporting members so that the oscillator can oscillate with respect to the frame in the direction of the Y-axis. In this construction, the drive portion drives the frame in the direction of the X-axis and causes the oscillator to oscillate with respect to the substrate in the direction of the X-axis. Further, the detection portion detects oscillation of the oscillator with respect to the substrate in the direction of the Y-axis to prevent undesirable external driving forces acting in directions other than that of the X-axis from being transmitted to the oscillator. Therefore, the angular rate around the Z-axis makes it easy for the oscillator to oscillate in the direction of the Y-axis, maintaining a high precision in detecting angular rate. According to what is disclosed in Japanese Patent Publication Laid-Open No. HEI 10-103960, in order to prevent part of a drive signal causing the oscillation portion to oscillate in the direction of the X-axis from leaking out in the direction of the Y-axis (such leak will be referred to hereinafter as cross talk) and acting as noise, a correction portion for causing the oscillation portion to oscillate in the direction of the Y-axis is provided to cause the oscillation portion to oscillate in the direction of the Y-axis by an amount large enough to counterbalance the cross talk.

However, in this kind of angular rate detecting device, the oscillation portion (the oscillator) cannot be caused to oscillate stably in a desired direction (the direction of the X-axis) with high precision because of not only a detection error of angular rate resulting from the cross talk but also processing inconsistency of the oscillation portion (the oscillator), the drive portion, the frame and the beams. Also, the oscillator cannot oscillate stably in a desired direction (the direction of the Y-axis) with high precision in accordance with a Coriolis force. Thus, the precision in detecting angular rate deteriorates.

Also, in an angular rate detecting device belonging to the aforementioned publications wherein the rectangular frame is connected to the substrate through the drive beams and the oscillator is connected to the inside of the frame through the detection beams, if the substrate is deformed owing to external factors such as a change in temperature, or an external force, etc., the frame and the drive beams are also deformed in accordance with the deformation of the substrate. Hence, an internal stress is generated in the drive beams, so that the non-linearity of the spring constant of the drive beams increases or the deformation amount of the drive beams is restricted. As a result, the oscillator cannot be caused to oscillate stably in a desired direction (in the direction of the X-axis) with high precision, and there is also caused a problem of deterioration of precision in detecting angular rate. Moreover, in this type of angular rate detecting device, a pair of drive beams are provided at opposed ends of each of the opposed sides of the frame. Therefore, the stress applied to one of the beams becomes too large, so that the non-linearity of the spring constant of the drive beams increases or the deformation amount of the drive beams is restricted. Thus, the oscillator cannot be caused to oscillate in a desired direction (the direction of the X-axis) with good stability, high precision and a great amplitude, so that the precision in detecting angular rate deteriorates.

Furthermore, in the angular rate detecting device belonging to the aforementioned publications, the oscillation and cross talk of the oscillator in the direction of the Y-axis generated in accordance with the Coriolis force are also inputted to the substrate through the frame and the beams. Then, the counter reaction against the inputted oscillation is reversely inputted to the oscillator from the substrate through the frame and the beams. The oscillation inputted to the oscillator becomes a cause of noise obscuring the angular rate to be detected. Therefore, if the oscillation and cross talk of the oscillator generated in accordance with the Coriolis force in the direction of the Y-axis become large, the precision in detecting angular rate deteriorates.

SUMMARY OF THE INVENTION

The present invention addresses the aforementioned problem. It is an objective of the present invention to provide an angular rate detecting device that reduces the effects of the processing inconsistency, the non-linearity of the beams and the oscillation of the oscillator resulting from the Coriolis force and thereby minimizes a detection error.

In order to achieve the aforementioned objective, according to a first aspect of the present invention, there is provided an angular rate detecting device comprising an oscillation portion, a drive portion, a detection portion and an angular rate detector. The oscillation portion is connected to a substrate via a supporting member and oscillatable over the substrate in directions of an X-axis and a Y-axis which are perpendicular to each other. The drive portion causes the oscillation portion to oscillate in the direction of the X-axis. The detection portion detects oscillation of the oscillation portion with respect to the substrate in the direction of the Y-axis. The angular rate detector detects, based on oscillation of the oscillation portion in the direction of the Y-axis, an angular rate that is effective around a Z-axis which is perpendicular to the X-axis and the Y-axis, with the oscillation portion oscillating in the direction of the X-axis. The drive portion comprises a plurality of sectional drive portions that are located differently in the direction of the Y-axis and capable of causing the oscillation portion to oscillate independently in the direction of the X-axis.

In this case, the aforementioned construction may have the following features. That is, the oscillation portion is composed of a frame and an oscillator that are connected through a beam. The sectional drive portions drive the frame with respect to the substrate in the direction of the X-axis and cause the oscillator to oscillate with respect to the substrate in the direction of the X-axis. The detection portion detects oscillation of the oscillator with respect to the substrate in the direction of the Y-axis.

In the thus-constructed angular rate detecting device of the present invention, for the case where the drive portion cannot cause the entire oscillation portion (or the entire oscillator through the frame) to oscillate along the direction of the Y-axis and in the direction of the X-axis homogeneously because of processing inconsistency of the drive portion, the frame and the like, the driving forces applied to the oscillation portion (or the frame) by the sectional drive portions are made different from one another. Thereby, the entire oscillation portion (or the oscillator through the frame) can be made to oscillate along the direction of the Y-axis and in the direction of the X-axis homogeneously. As a result, according to the present invention, when the oscillation portion (or the frame) oscillates due to the driving by the drive portion, it is possible to reduce an undesirable oscillation component in the direction of the Y-axis contained in oscillation of the oscillation portion (or the oscillator through the frame) as well as an undesirable rotational component around a Z-axis that is perpendicular to the X-axis and the Y-axis. In this manner, it is possible to cause the oscillation portion (the oscillator through the frame) to oscillate with high precision, whereby the precision in detecting angular rate around the Z-axis is enhanced.

In this case, preferably, in using the aforementioned angular rate detecting device, drive signals that are independent from one another are supplied to the sectional drive portions respectively, and a drive signal generation circuit for making a driving force resulting from at least one of the drive signals variable is connected to the angular rate detecting device.

In the aforementioned angular rate detecting device, preferably, each of the sectional drive portions is composed of a pair of drive electrodes that are disposed on a line extending in the direction of the X-axis. This construction makes it possible to drive the oscillation portion more stably through the respective pairs of the drive electrodes and to stabilize oscillation of the oscillation portion in the direction of the X-axis. Consequently, it is possible to enhance the precision in detecting angular rate.

In using the angular rate detecting device, a drive signal generation circuit may be connected thereto. This drive signal generation circuit supplies a plurality of sets of drive signals to the sectional drive portions respectively with a set of drive signals corresponding to a pair of drive electrodes that constitute each of the sectional drive portions, and sets the respective sets of drive signals opposite in phase and makes a driving force resulting from at least one of the sets of drive signals variable. Due to this construction, the driving forces applied to the oscillation portion by the sectional drive portions can be adjusted as in the case described above.

Further, according to another structural feature of the present invention, there is provided an angular rate detecting device comprising a frame, an oscillator, a drive portion and an angular rate detector. The frame is connected to a substrate through a driving beam and oscillatable with respect to the substrate in a direction of an X-axis. The oscillator is connected to an inside of the frame through the detecting beam and supported oscillatably with respect to the substrate in the direction of the X-axis and in a direction of a Y-axis that is perpendicular to the X-axis. The drive portion causes the frame to oscillate with respect to the substrate in the direction of the X-axis. The detection portion detects oscillation of the oscillator with respect to the substrate in the direction of the Y-axis. The angular rate detector detects, based on oscillation of the oscillation portion in the direction of the Y-axis, an angular rate that is effective around a Z-axis which is perpendicular to the X-axis and the Y-axis, with the oscillation portion oscillating in the direction of the X-axis. In this angular rate detecting device, the frame is divided into a plurality of sections.

In this construction, even if the substrate is deformed owing to external factors such as a change in temperature, an external force and the like, the deformation is absorbed by the detecting beam, because the frame is divided into a plurality of sections in the direction of the Y-axis and these sections are connected to one another oscillatably, that is, elastically by the detecting beam through the oscillator. Thus, the divided sections can be prevented from affecting one another, and the deformation amount of the driving beam can be restrained. Accordingly, it is possible to maintain an internal stress of the driving beam resulting from the external factors at a very small value, to appropriately maintain linearity of the spring constant of the driving beam, and to maintain the maximum deformation amount of the driving beam at a large value. Therefore, the oscillator can be caused to oscillate with good stability, high precision and a great amplitude in the direction of the X-axis, whereby the precision in detecting angular rate can be kept at a good level.

Further, according to another structural feature of the present invention, there is provided an angular rate detecting device comprising the substrate, the driving beam, the frame, the detecting beam, the oscillator, the drive portion and the detection portion. In this angular rate detecting device, the driving beam is composed of a pair of drive beams that are disposed symmetrically with respect to a central position of the frame in the direction of the X-axis and at least another drive beam provided between the pair of the drive beams.

In this construction, the frame can be supported with respect to the substrate through a multitude of drive beams. Therefore, the stress applied to each of the drive beams can be kept small, the linearity of the spring constant of the driving beam can be maintained appropriately, and the maximum deformation amount of the driving beam can be maintained at a large value. Accordingly, it becomes possible to cause the oscillator to oscillate with good stability, high precision and a great amplitude in the direction of the X-axis, whereby the precision in detecting angular rate can be enhanced.

Further, according to another structural feature of the present invention, there is provided an angular rate detecting device of the aforementioned type. In this angular rate detecting device, the frame comprises a main frame having a portion extending in the direction of the X-axis and connected to the oscillator through the detecting beam and a sub-frame extending in parallel with the portion of the main frame extending in the direction of the X-axis. Besides, the driving beam comprises a first driving beam connecting the substrate with the sub-frame and supporting the sub-frame oscillatably with respect to the substrate in the direction of the X-axis and a second driving beam connecting the sub-frame with the main frame and supporting the main frame oscillatably with respect to the substrate in the direction of the X-axis.

In the thus-constructed angular rate detecting device wherein the sub-frame is provided between the main frame and the substrate, the sub-frame functions as a reinforcing member for the driving beam. Thus, the deformation of the main frame in the direction of the Y-axis resulting from the deformation of the driving beam is restrained, whereby it becomes possible to cause the main frame to oscillate with good stability, high precision and a great amplitude in the direction of the X-axis. Further, it becomes possible to cause the oscillator through the main frame to oscillate with good stability, high precision and a great amplitude in the direction of X-axis. Consequently, the precision in detecting angular rate can be enhanced.

Further, according to another structural feature of the present invention, there is provided an angular rate detecting device comprising a frame, an oscillator, a drive portion, a detection portion, an angular rate detector and a correction portion. The frame is connected to a substrate through a driving beam and oscillatable with respect to the substrate in a direction of an X-axis. The oscillator is connected to the frame through the driving beam and supported oscillatably with respect to the substrate. The drive portion causes the frame to oscillate with respect to the substrate in the direction of the X-axis. The detection portion detects oscillation of the oscillator with respect to the substrate in a direction of a Y-axis that is perpendicular to the X-axis. The angular rate detector detects, based on oscillation of the oscillation portion in the direction of the Y-axis, an angular rate that is effective around a Z-axis which is perpendicular to the X-axis and the Y-axis, with the oscillation portion oscillating in the direction of the X-axis. The correction portion retrieves an oscillation component of the frame with respect to the substrate in the direction of the Y-axis.

In this case, the driving beam may support the frame such that the frame tends to oscillate with respect to the substrate more easily in the direction of the X-axis than in the direction of the Y-axis, and the detecting beam may be connected to the frame such that the oscillator tends to oscillate with respect to the substrate more easily in the direction of the Y-axis than in the direction of the X-axis.

In the present invention thus constructed, even in the case where an oscillation component of the frame in the direction of the Y-axis is generated by the driving thereof in the direction of the X-axis owing to the processing inconsistency of the frame and the like, where the oscillation component of the frame in the direction of the Y-axis is transmitted to the oscillator through the detection beam, and where there is generated in the oscillator an undesirable oscillation component in the direction of the Y-axis which component causes an error in detecting angular rate, the oscillation component of the frame with respect to the substrate in the direction of the Y-axis as detected by the correction portion is used to eliminate the undesirable oscillation component of the oscillator in the direction of the Y-axis. Therefore, the precision in detecting angular rate can be kept at a good level.

In this case, in using this angular rate detecting device, the detection portion may be electrically connected to the correction portion, and the oscillation component of the frame in the direction of the Y-axis retrieved by the correction portion may be removed from the oscillation component of the oscillator in the direction of the Y-axis detected by the detection portion. Also, there may be provided an arithmetic circuit for removing the oscillation component of the frame in the direction of the Y-axis retrieved by the correction portion from the oscillation component of the oscillator in the direction of the Y-axis detected by the detection portion.

Further, according to another structural feature of the present invention, there is provided an angular rate detecting device comprising an oscillation portion, a drive portion, a detection portion, an angular rate detector, a servo portion, a drive circuit, a retrieval circuit, a servo control circuit and an output circuit. The oscillation portion is connected to a substrate via a supporting member and oscillatable over the substrate in directions of an X-axis and a Y-axis which are perpendicular to each other. The drive portion causes the oscillation portion to oscillate in the direction of the X-axis. The detection portion detects oscillation of the oscillation portion with respect to the substrate in the direction of the Y-axis. The angular rate detector detects, based on oscillation of the oscillation portion in the direction of the Y-axis, an angular rate that is effective around a Z-axis which is perpendicular to the X-axis and the Y-axis, with the oscillation portion oscillating in the direction of the X-axis. The servo portion restrains oscillation of the oscillation portion in the direction of the Y-axis. The drive circuit causes the oscillation portion to oscillate with respect to the substrate in the direction of the X-axis with a predetermined amplitude, in cooperation with the drive portion. The retrieval circuit retrieves a signal indicative of oscillation of the oscillation portion with respect to the substrate in the direction of the Y-axis, in cooperation with the detection portion. The servo control circuit forms a servo control signal for restraining oscillation of the oscillation portion in the direction of the Y-axis based on the retrieved signal indicative of oscillation of the oscillation portion in the direction of the Y-axis, supplying the formed servo control signal to the servo portion, and then restraining oscillation of the oscillation portion in the direction of the Y-axis. The output circuit outputs a signal corresponding to the formed servo control signal as a signal indicative of the angular rate.

In this case, the servo control circuit may comprise a servo signal supplying circuit for inputting the retrieved signal indicative of oscillation of the oscillation portion in the direction of the Y-axis, supplying the servo portion with an AC servo control signal for restraining oscillation of the oscillation portion in the direction of the Y-axis in accordance with the inputted signal, and restraining oscillation of the oscillation portion in the direction of the Y-axis. The output circuit may comprise a DC-conversion circuit for converting the AC servo control signal into a DC signal proportional to an amplitude value of the AC servo control signal.

Further, the servo control circuit may comprise a reference signal forming circuit that is connected to the drive circuit and forms a reference signal having a predetermined amplitude and corresponding to a phase of oscillation of the oscillation portion resulting from an angular rate, a DC-conversion circuit for converting the retrieved signal indicative of oscillation of the oscillation portion in the direction of the Y-axis into a DC servo control signal proportional to an amplitude value of the signal and outputting the DC servo control signal, and a servo signal supplying circuit for controlling the amplitude of the reference signal in accordance with the DC servo control signal, supplying the servo portion with the amplitude-controlled reference signal and restraining oscillation of the oscillation portion in the direction of the Y-axis. The output circuit may be designed to output the DC servo control signal as a signal indicative of the angular rate.

In this construction, the servo control circuit restrains the oscillation of the oscillation portion in the direction of the Y-axis caused by an angular rate effective around the Z-axis by means of a servo control signal (an AC or DC servo control signal) corresponding to the magnitude of the oscillation. Thus, the oscillation of the oscillation portion in the direction of the Y-axis is eliminated or the oscillation is allowed with a very small amplitude. On the other hand, the servo control signal corresponds to the oscillation of the oscillation portion in the direction of the Y-axis caused by the angular rate. Therefore, the servo control signal can be retrieved as a signal indicative of the angular rate. As a result, noise is prevented from being generated by reverse input of the oscillation of the oscillation portion in the direction of the Y-axis caused by the angular rate into the oscillation portion through the substrate, whereby the precision in detecting angular rate can be enhanced.

Further, according to another structural feature of the present invention, there is provided an angular rate detecting device comprising the substrate, the supporting member, the oscillation portion, the drive portion, the detection portion, the servo portion, the drive circuit and the retrieval circuit. This angular rate detecting device is provided with a first servo control circuit, a second servo control circuit and an output circuit. The first servo control circuit forms a first servo control signal for restraining oscillation of the oscillation portion in the direction of the Y-axis based on the inputted signal that is retrieved by the retrieval circuit and indicates oscillation of the oscillation portion in the direction of the Y-axis and a signal that is inputted from the drive circuit and is synchronous with oscillation of the oscillation portion caused by the angular rate, supplies the formed first servo control signal to the servo portion, and then restrains oscillation of the oscillation portion in the direction of the Y-axis. The second servo control circuit forms a second servo control signal for restraining cross talk based on the inputted signal that is retrieved by the retrieval circuit and indicates oscillation of the oscillation portion in the direction of the Y-axis and a signal that is inputted from the drive circuit and is synchronous with the cross talk of the oscillation portion in the direction of the Y-axis caused by the driving thereof, supplies the formed second servo control signal to the servo portion, and then restrains oscillation of the oscillation portion in the direction of the Y-axis. The output circuit outputs a signal corresponding to the first servo control signal as a signal indicative of the angular rate.

In this case, the first servo control circuit may comprise a first reference signal forming circuit for controlling the amplitude of the signal that is inputted from the drive circuit and is synchronous with oscillation of the oscillation portion caused by the angular rate and forming a first reference signal of a predetermined amplitude, a first synchronous detection circuit for synchronously detecting the retrieved signal indicative of oscillation of the oscillation portion in the direction of the Y-axis with the signal that is inputted from the drive circuit and is synchronous with oscillation of the oscillation portion caused by the angular rate and forming a first servo control signal proportional to the magnitude of oscillation of the oscillation portion in the direction of the Y-axis caused by the angular rate, and a first servo control signal supplying circuit for controlling the amplitude of the first reference signal in accordance with the first servo control signal, supplying the servo portion with the amplitude-controlled first reference signal and restraining oscillation of the oscillation portion in the direction of the Y-axis caused by the angular rate. The second servo control circuit may comprise a second reference signal forming circuit for controlling the amplitude of the signal that is inputted from the drive circuit and is synchronous with cross talk of the oscillation portion caused by the driving thereof and forming a second reference signal of a predetermined amplitude, a second synchronous detection circuit for synchronously detecting the retrieved signal indicative of oscillation of the oscillation portion in the direction of the Y-axis with the signal that is inputted from the drive circuit and is synchronous with cross talk of the oscillation portion caused by the driving thereof and forming a second servo control signal proportional to the magnitude of oscillation of the oscillation portion in the direction of the Y-axis caused by the driving thereof, and a second servo control signal supplying circuit for controlling the amplitude of the second reference signal in accordance with the second servo control signal, supplying the servo portion with the amplitude-controlled second reference signal and restraining oscillation of the oscillation portion in the direction of the Y-axis caused by the driving thereof. The output circuit may be designed to output the first servo control signal as a signal indicative of the angular rate.

In this construction, the first servo control circuit restrains oscillation of the oscillation portion in the direction of the Y-axis caused by the angular rate. Thus, noise is prevented from being generated by reverse input of the oscillation of the oscillation portion in the direction of the Y-axis caused by the angular rate into the oscillation portion through the substrate. The second servo control circuit restrains cross talk of the oscillation portion in the direction of the Y-axis caused by the driving thereof. Thus, the generation of cross talk in the direction of the Y-axis resulting from the driving is also prevented. Accordingly, the precision in detecting angular rate can be enhanced. Further, the oscillation of the oscillation portion caused by the angular rate is different in phase by 90° from the cross talk caused by the driving of the oscillation portion. The oscillation of the oscillation portion in the direction of the Y-axis is servo-controlled by means of a control signal that is different in phase by 90°. Thus, as for all the phase components of the drive oscillation frequency of the oscillation portion, the oscillation in the direction of the Y-axis is servo-controlled. As a result, the servo control can be performed suitably.

Further, according to another structural feature of the present invention, the second servo control circuit is designed to input from the drive circuit a signal different in phase from the signal that is synchronous with oscillation of the oscillation portion caused by the angular rate, input from the retrieval circuit a detection signal indicative of oscillation of the oscillation portion in the direction of the Y-axis, form a second servo control signal for restraining an oscillation component of the oscillation portion in the direction of the Y-axis which component is synchronous with the signal different in phase, supply the formed second servo control signal to the servo portion, and restrain the oscillation component of the oscillation portion in the direction of the Y-axis which component is synchronous with the signal different in phase. In this case, the signal different in phase is a signal whose phase is different by 90° from the phase of the signal that is synchronous with the oscillation caused by the angular rate.

In this construction, apart from the problem of the cross talk of the oscillation portion in the direction of the Y-axis, the first and second servo control circuits serve to control oscillation of the oscillation portion in the direction of the Y-axis with a different phase (a phase different by 90°). Due to the two types of servo control that are different in phase, as for all the phase components of the drive oscillation frequency of the oscillation portion, the oscillation in the direction of the Y-axis is servo-controlled. As a result, the servo control can be performed suitably.

Further, according to another structural feature of the present invention, in the angular rate detecting device that performs servo control so as to restrain oscillation of the oscillation portion in the direction of the Y-axis, there is provided an abnormality judging circuit on a downstream side of a path of a signal indicative of oscillation of the oscillation portion in the direction of the Y-axis. The abnormality judging circuit supplies an upstream portion of the path with a dummy signal of a predetermined frequency, superposes the dummy signal onto the signal indicative of oscillation of the oscillation portion in the direction of the Y-axis, and judges whether or not there is an abnormality present in the path, based on whether or not receiving the dummy signal.

In this construction, for example, if the path of the signal indicative of oscillation in the direction of the Y-axis is not disconnected, the abnormality judging circuit receives the dummy signal that has passed through the path. If the path is partially disconnected, the abnormality judging circuit fails to receive the dummy signal and determines that there is an abnormality in the path. Accordingly, even in the case where the oscillation of the oscillation portion in the direction of the Y-axis is restrained by the servo control and the amplitude of the signal indicative of oscillation of the oscillation portion in the direction of the Y-axis is "0" or a very small value, the abnormality judging circuit can judge with no delay, based on the presence or absence of the dummy signal, whether or not there is an abnormality resulting from disconnection of the path.

BRIEF DESCRIPTION OF THE DRAWINGS

The foregoing and further objects, features and advantages of the present invention will become apparent from the following description of preferred embodiments with reference to the accompanying drawings, wherein.

DETAILED DESCRIPTION OF PREFERRED EMBODIMENTS

Figure 1:
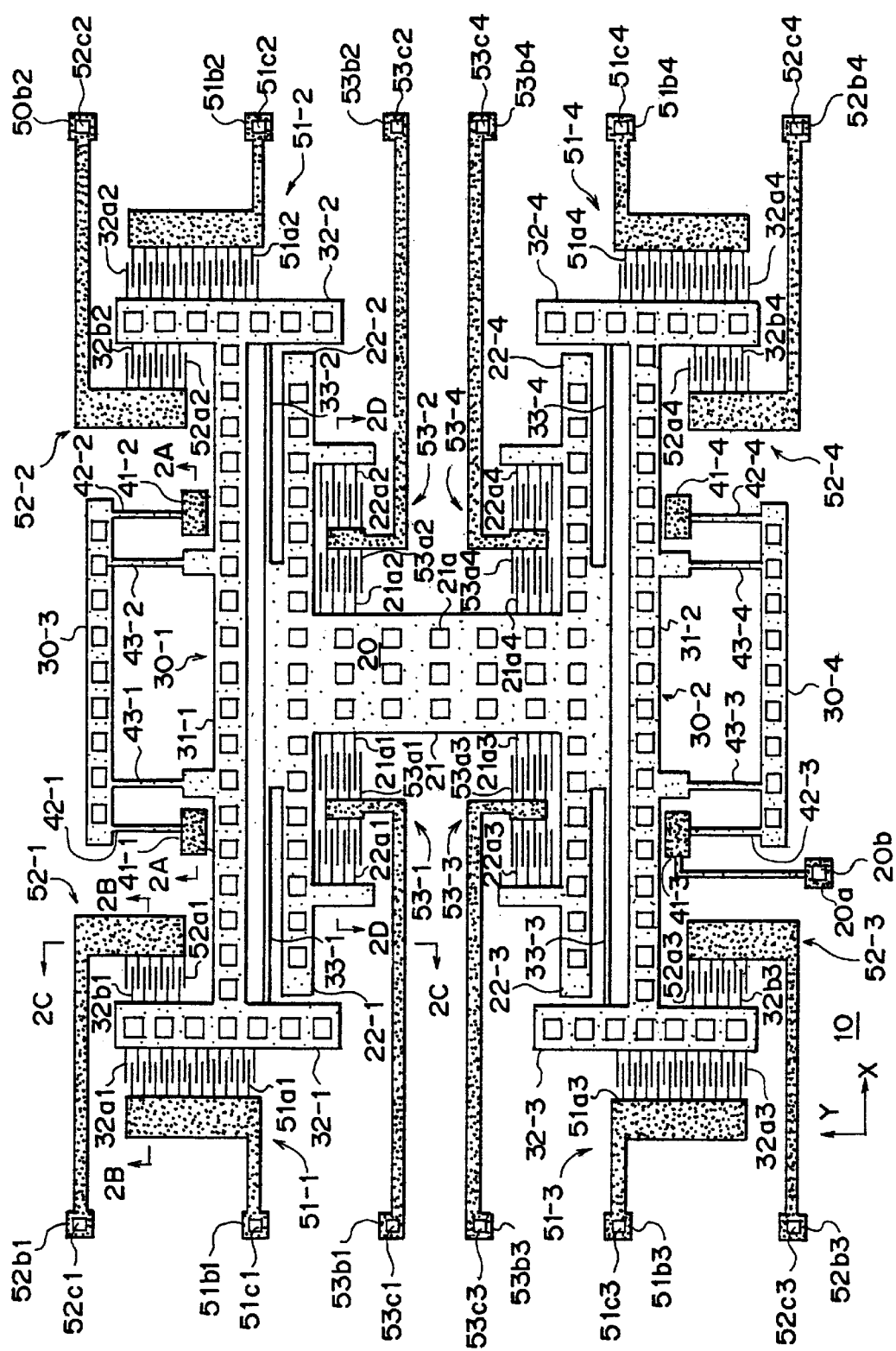
FIG. 1 is a plan view of an angular rate detecting element according to a first embodiment of the present invention.

A first embodiment of the present invention will be described hereinafter with reference to the accompanying drawings. FIG. 1 is a plan view of an angular rate detecting element composed of a semiconductor according to the first embodiment. FIGS. 2A, 2B, 2C and 2D are sectional views of respective portions of the angular rate detecting element shown in FIG. 1. In FIG. 1, different patterns are used to distinguish between those members which form a gap with the upper face of a substrate 10 and those members which form no gap therewith.

This angular rate detecting element is symmetrically formed with respect to center lines in directions of X and Y axes, which are perpendicular to one another in a horizontal plane. An oscillator 20, a pair of main frames 30-1 and 30-2, and a pair of sub-frames 30-3 and 30-4 are extended disposed in a horizontal plane that is spaced apart from the upper face of the substrate 10 by a predetermined distance. The substrate 10 is made of silicon and has a rectangular shape. The oscillator 20 and the respective frames 30-1, 30-2, 30-3 and 30-4 constitute an oscillating portion that is oscillatably supported over the substrate 10.

When oscillating in the direction of the X-axis, the oscillator 20 oscillates in the direction of the Y-axis with an amplitude proportional to an angular rate around a Z-axis, which is perpendicular to both the X and Y axes. The oscillator 20, which is formed substantially in the shape of the letter H, is composed of a rectangular mass portion 21 and four arm portions 22-1 through 22-4. The mass portion 21 is disposed in a central portion of the oscillator 20, has a suitable mass, and is provided with sides extending in the directions of the X and Y axes, respectively. Each of the arm portions 22-1 through 22-4 extends from a corner position of the mass portion 21 in the direction of the X-axis. A plurality of rectangular through holes 21a are provided in wide portions such as the mass portions 21 and the arm portions 22-1 through 22-4. These through holes 21a serve to carry out etching below the mass portion 21, the arm portions 22-1 through 22-4 and the like.

The main frames 30-1 and 30-2 cause the oscillator 20 to oscillate. The main frame 30-1 and 30-2 are formed substantially in the shape of I. The main frame 30-1 is composed of a wide long-extension portion 31-1 and wide terminal portions 32-1 and 32-2, while the main frame 30-2 is composed of a wide long-extension portion 31-2 and wide terminal portions 32-3 and 32-4. The long-extension portion 31-1 extends in the direction of the X-axis and is located outwardly of the arm portions 22-1 and 22-2 in the direction of the Y-axis, while the long-extension portion 31-2 extends in the direction of the X-axis and is located outwardly of the arm portions 22-3 and 22-4 in the direction of the Y-axis. The terminal portions 32-1 and 32-2 extend from opposed ends of the long-extension portion 31-1 briefly in the direction of the Y-axis, while the terminal portions 32-3 and 32-4 extend from opposed ends of the long-extension portion 31-2 briefly in the direction of the Y-axis. The sub-frames 30-3 and 30-4 are also wide and extend in the direction of the X-axis outwardly of the long-extension portions 31-1 and 31-2 respectively. Through holes similar to the through holes 21a formed in the oscillator 20 are formed in the main frames 30-1 and 30-2 and the sub-frames 30-3 and 30-4.

In this case, there is a gap formed in the direction of the Y-axis between inner ends of the terminal portions 32-1 and 32-3 of the main frames 30-1 and 30-2, while there is a gap formed in the direction of the Y-axis between inner ends of the terminal portions 32-2 and 32-4 of the main frames 30-1 and 30-2. This means that the main frames 30-1 and 30-2 are divided into a plurality of sections in the direction of the Y-axis instead of entirely surrounding the oscillator 20.

The main frames 30-1 and 30-2 are coupled to the oscillator 20 through beams 33-1 and 33-2 and beams 33-3 and 33-4 respectively. The beams 33-1 through 33-4 also extend in the direction of the X-axis in a horizontal plane that is spaced apart from the upper face of the substrate 10 by a predetermined distance. The beams 33-1 through 33-4 are connected at one end to the arm portions 22-1 through 22-4 of the oscillator 20 respectively in the vicinity of their roots. The beams 33-1 through 33-4 are connected at the other end to the terminal portions 32-1 through 32-4 of the main frames 30-1 and 30-2 respectively. The beams 33-1 through 33-4 have narrower widths than the arm portions 22-1 through 22-4 of the oscillator 20, the long-extension portions 31-1 and the terminal portions 32-1 and 32-2 of the main frame 30-1, and the long-extension portions 31-2 and the terminal portions 32-3 and 32-4 of the main frame 30-2. This construction makes it difficult transmit oscillation from the main frames 30-1 and 30-2 to the oscillator 20 in the direction of the Y-axis, and enables effective transmission of oscillation in the direction of the X-axis. With respect to the main frames 30-1 and 30-2, the oscillator 20 tends to oscillate in the direction of the Y-axis rather than in the direction of the X-axis. In other words, the beams 33-1 through 33-4 have functions of supporting the oscillator 20 such that the oscillator 20 can oscillate in the direction of the Y-axis with respect to the substrate 10, the main frames 30-1 and 30-2, and the sub-frames 30-3 and 30-4.

Figure 2A:
FIG. 2A is a sectional view taken along line 2A—2A in FIG. 1.

The main frame 30-1 is oscillatably supported by the substrate 10 through anchors 41-1 and 41-2, beams 42-1 and 42-2, the sub-frame 30-3 and beams 43-1 and 43-2. As shown in FIG. 1 and 2A, the anchors 41-1 and 41-2 are attached to the upper face of the substrate 10 at locations outwardly of the long-extension portion 31-1 of the main frame 30-1 in the direction of the Y-axis. The beams 42-1 and 42-2 are connected at one end to the anchors 41-1 and 41-2 respectively. The beams 42-1 and 42-2 extend from the anchors 41-1 and 41-2 respectively outwardly in the direction of the Y-axis. Leading ends of the beams 42-1 and 42-2 are connected to inner ends of the sub-frame 30-3. The beams 43-1 and 43-2, which extend inwardly of the sub-frame 30-3 in the direction of the Y-axis, are connected at one end to the sub-frame 30-3. The beams 43-1 and 43-2 are connected at the other end to ends of the long-extension portion 31-1 of the main frame 30-1, which ends are located outwardly in the direction of the Y-axis. As is the case with the oscillator 20, the main frames 30-1 and 30-2, and the sub-frames 30-3 and 30-4, the beams 42-1, 42-2, 43-1 and 43-2 are disposed in such a manner as to float above the substrate 10 by a predetermined distance. As is the case with the beams 33-1 and 33-2, the beams 42-1, 42-2, 43-1 and 43-2 also have narrow widths. The main frame 30-2 is oscillatably supported by the substrate 10 through anchors 41-3 and 41-4, beams 42-3 and 42-4, the sub-frame 30-4 and beams 43-3 and 43-4. The anchors 41-3 and 41-4, the beams 42-3 and 42-4, the sub-frame 30-4 and the beams 43-3 and 43-4 are symmetrical to the anchors 41-1 and 41-2, the beams 42-1 and 42-2, the sub-frame 30-3 and the beams 43-1 and 43-2 respectively with respect to the central line in the direction of the Y-axis. The anchors 41-3 and 41-4, the beams 42-3 and 42-4, the sub-frame 30-4 and the beams 43-3 and 43-4 are constructed in the same manner as to the anchors 41-1 and 41-2, the beams 42-1 and 42-2, the sub-frame 30-3 and the beams 43-1 and 43-2 respectively. In this construction, the main frames 30-1 and 30-2 are supported such that they oscillate with ease in the direction of the X-axis and with difficulty in the direction of the Y-axis with respect to the substrate 10. That is, the beams 42-1 through 42-4 and 43-1 through 43-4 have functions of supporting the main frames 30-1 and 30-2, the sub-frames 30-3 and 30-4 and the oscillator 20 such that these members can oscillate in the direction of the X-axis with respect to the substrate 10. The sub-frames 30-3 and 30-4 function as reinforcing members and make it difficult for the beams 42-1 through 42-4 and 43-1 and 43-4 to oscillate in a direction other than that of the X-axis. The anchors 41-1 through 41-4, the beams 42-1 through 42-4, 43-1 through 43-4, and 33-1 through 33-4 constitute a supporting member that supports an oscillating portion (the oscillator 20 and the frames 30-1 through 30-4) such that the oscillating portion can oscillate with respect to the substrate 10.

Disposed on the substrate 10 are drive electrode portions 51-1 through 51-4, drive monitor electrode portions 52-1 through 52-4, and detection electrode portions 53-1 through 53-4. The drive electrode portions 51-1 through 51-4 drive the main frames 30-1 and 30-2 in the direction of the X-axis with respect to the substrate 10. The drive monitor electrode portions 52-1 through 52-4 monitor the driving of the main frames 30-1 and 30-2 in the direction of the X-axis with respect to the substrate 10. The detection electrode portions 53-1 through 53-4 detect oscillation of the oscillator 20 in the direction of the Y-axis with respect to the substrate 10.

Figure 2B:
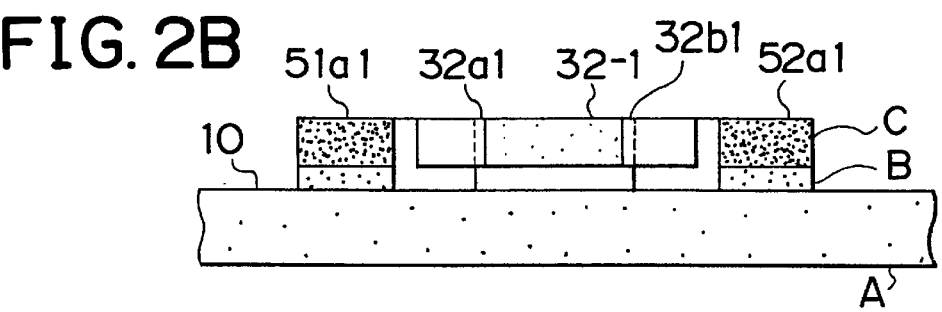
FIG. 2B is a sectional view taken along line 2B—2B in FIG. 1.

The drive electrode portions 51-1 through 51-4 are provided with comb-like electrodes $51a1$ through $51a4$ respectively, each of which is composed of a plurality of electrodes. The comb-like electrodes $51a1$ and $51a2$ extend from locations outwardly of the terminal portions 32-1 and 32-2 of the main frame 30-1 respectively in the direction of the X-axis, while the comb-like electrodes $51a3$ and $51a4$ extend from locations outwardly of the terminal portions 32-3 and 32-4 of the main frame 30-2 respectively in the direction of the X-axis. As shown in FIG. 1 and 2B, the comb-like electrodes 51a1 through 51a4 has their electrodes 51a1 through 51a4 respectively, to which pad portions 51b1 through 51b4 are connected respectively. That is, the comb-like electrodes 51a1 through 51a4 are formed integrally with the pad portions 51b1 through 51b4 respectively, and attached to the upper face of the substrate 10. Disposed on upper faces of the pad portions 51b1 through 51b4 are electrode pads 51c1 through 51c4 respectively, which are made of a conductive metal (e.g. aluminum). The terminal portions 32-1 through 32-4 are provided with comb-like electrodes 32a1 through 32a4 respectively, each of which is composed of a plurality of electrodes. The comb-like electrodes 32a1 through 32a4 extend outwardly in the direction of the X-axis and are located opposite the comb-like electrodes 51a1 through 51a4 respectively. The comb-like electrodes 32a1 through 32a4, which are formed integrally with the terminal portions 32-1 through 32-4 respectively, are disposed in such a manner as to float above the upper face of the substrate 10 by a predetermined distance. Each of the electrodes of each of the comb-like electrodes 32a1 through 32a4 reaches a central position between corresponding adjacent ones of the electrodes of each of the comb-like electrodes 51a1 through 51a4, and is located opposite the adjacent electrodes.

Figure 2C:
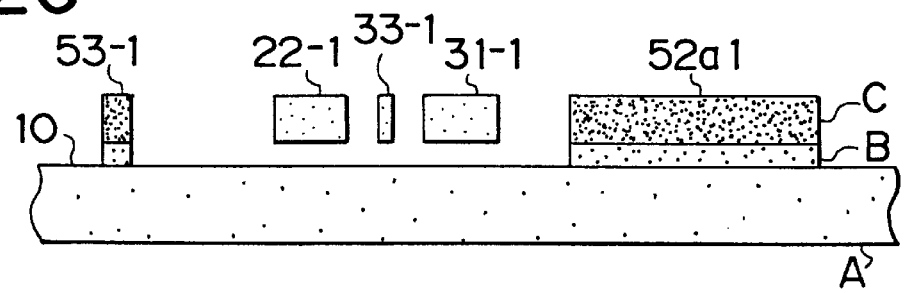
FIG. 2C is a sectional view taken along line 2C—2C in FIG. 1.

The drive monitor electrode portions 52-1 and 52-2 are disposed inwardly of the terminal portions 32-1 and 32-2 of the main frame 30-1 respectively in the direction of the X-axis, while the drive monitor electrode portions 52-3 and 52-4 are disposed inwardly of the terminal portions 32-3 and 32-4 of the main frame 30-2 respectively in the direction of the X-axis. The drive monitor electrode portions 52-1 through 52-4 are provided with comb-like electrodes 52a1 through 52a4 respectively, each of which is composed of a plurality of electrodes. The comb-like electrodes 52a1 and 52a2 extend toward the terminal portions 32-1 and 32-2 of the main frame 30-1 respectively in the direction of the X-axis, while the comb-like electrodes 52a3 and 52a4 extend toward the terminal portions 32-3 and 32-4 of the main frame 30-2 respectively in the direction of the X-axis. As shown in FIGS. 1, 2B and 2C, the comb-like electrodes 52a1 through 52a4 has their electrodes 52a1 through 52a4 respectively, to which pad portions 52b1 through 52b4 are connected respectively. That is, the comb-like electrodes 52a1 through 52a4 are formed integrally with the pad portions 52b1 through 52b4 respectively, and attached to the upper face of the substrate 10. Disposed on upper faces of the pad portions 52b1 through 52b4 are electrode pads 52c1 through 52c4 respectively, which are made of a conductive metal (e.g. aluminum). The terminal portions 32-1 through 32-4 are provided with comb-like electrodes 32b1 through 32b4 respectively, each of which is composed of a plurality of electrodes. The comb-like electrodes 32b1 through 32b4 extend inwardly in the direction of the X-axis and are located opposite the comb-like electrodes 52a1 through 52a4 respectively. The comb-like electrodes 32b1 through 32b4, which are formed integrally with the terminal portions 32-1 through 32-4 respectively, are disposed in such a manner as to float above the upper face of the substrate 10 by a predetermined distance. Each of the electrodes of each of the comb-like electrodes 32b1 through 32b4 reaches a central position between corresponding adjacent ones of the electrodes of each of the comb-like electrodes 52a1 through 52a4, and is located opposite the adjacent electrodes.

Figure 2D:
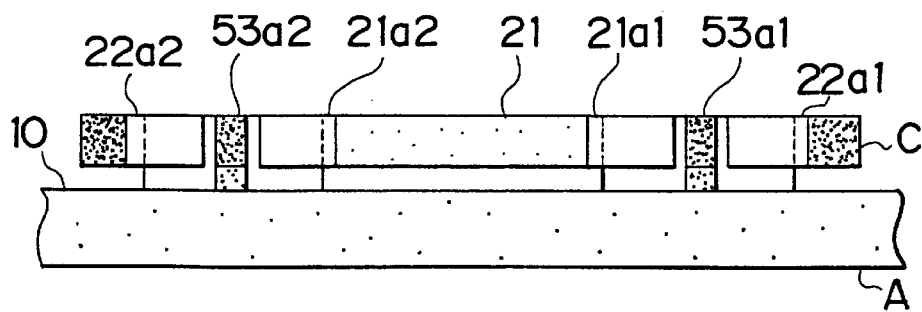
FIG. 2D is a sectional view taken along line 2D—2D in FIG. 1.

The detection electrode portions 53-1 through 53-4 are disposed at locations outwardly of the mass portion 21 in the direction of the X-axis. The detection electrode portions 53-1 through 53-4 are provided with comb-like electrodes 53a1 through 53a4 respectively, each of which is composed of a plurality of electrodes. The comb-like electrodes 53a1 through 53a4 extend both inwardly and outwardly of the detection electrode portions 53-1 through 53-4 respectively in the direction of the X-axis. As shown in FIG. 1 and 2D, the comb-like electrodes 53a1 through 53a4 has their electrodes 53a1 through 53a4 respectively, to which pad portions 53b1 through 53b4 are connected respectively. That is, the comb-like electrodes 53a1 through 53a4 are formed integrally with the pad portions 53b1 through 53b4 respectively, and attached to the upper face of the substrate 10. Disposed on upper faces of the pad portions 53b1 through 53b4 are electrode pads 53c1 through 53c4 respectively, which are made of a conductive metal (e.g. aluminum). The mass portion 21 of the oscillator 20 is provided with comb-like electrodes 21a1 through 21a4, each of which is composed of a plurality of electrodes. Each of the comb-like electrodes 21a1 through 21a4, which extends outwardly in the direction of the X-axis, is located opposite one of each of the comb-like electrodes 53a-1 through 53a-4 respectively. The arm portions 22-1 through 22-4 of the oscillator 20 are provided, at their central portions, with comb-like electrodes 22a1 through 22a4 respectively, each of which is composed of a plurality of electrodes. Each of the comb-like electrodes 22a1 through 22a4, which extends inwardly in the direction of the X-axis, is located opposite the other of each of the comb-like electrodes 53a-1 through 53a-4 respectively. The comb-like electrodes 21a1 through 21a4 and 22a1 through 22a4 are formed integrally with the mass portion 21 and the arm portions 22-1 through 22-4 respectively, and are disposed in such a manner as to float above the upper face of the substrate 10 by a predetermined distance. Each of the electrodes of each of the comb-like electrodes 21a1 through 21a4 and 22a1 through 22a4 is interposed between corresponding adjacent ones of the electrodes of each of the comb-like electrodes 53a1 through 53a4, and is located opposite the adjacent electrodes. In this case, each of the electrodes of the comb-like electrodes 21a1 through 21a4 and 22a1 through 22a4 is offset towards one side from a central position between corresponding adjacent ones of each of the comb-like electrodes 53a1 through 53a4.

Furthermore, a pad portion 20a is disposed on the substrate 10. The pad portion 20a is electrically connected to the oscillator 20 through the beams 33-3 and 33-4, the main frame 30-2, the beams 43-3 and 43-4, the sub-frame 30-4, the beam 42-3 and the anchor 41-3. The pad portion 20a is formed integrally with the anchor 41-3 and attached to the upper face of the substrate 10. Disposed on the upper face of the pad portion 20a is an electrode pad 20b, which is made of a conductive metal (e.g. aluminum).

Next, a method of manufacturing an angular rate detecting element having the aforementioned construction will be described briefly with reference to FIG. 2A, 2B, 2C, and 2D. First of all, an SOI (Silicon-on-Insulator) substrate is prepared wherein a single-crystal silicon layer C is disposed on an upper face of a single-crystal silicon layer A through a silicon oxidation film B. The single-crystal silicon layer C is doped with impurities such as phosphorus and boron, so that the resistance of the layer C is lowered. This layer will be hereinafter referred to as the low-resistance layer C. Then, patterned sections in FIG. 1 (except the through holes 21a formed in the oscillator 20 and the through holes formed in the main frames 30-1 and 30-2 and the sub-frames 30-3 and 30-4) and the respective electrodes are masked with a resist film. The single-crystal silicon layer C is subjected to etching by means of reactive ion etching or the like. Thereby the anchors 41-1 through 41-4, the respective comb-like electrodes 51a1 through 51a4, 52a1 through 52a4 and 53a1 through 53a4, the respective pad portions 20a, 51b1 through 51b4, 52b1 through 52b4 and 53b1 through 53b4, and the like (the sections attached to the substrate 10) are formed on the silicon oxidation layer B. Then, the silicon oxidation layer B is partially removed from sections other than the sections attached to the substrate 10 by means of etching using water solution of hydrofluoric acid. Thereby the oscillator 20, the beams 33-1 through 33-4, the main frames 30-1 and 30-2, the sub-frames 30-3 and 30-4, the beams 42-1 through 42-4 and 43-1 through 43-2, and the comb-like electrodes 32a1 through 32a4, 32b1 through 32b4, 21a1 through 21a4 and 22a1 through 22a4 (the sections floating above the substrate 10 by the predetermined distance) are formed. Then, aluminum or the like is evaporated on the respective pad portions 20a, 51b1 through 51b4, 52b1 through 52b4 and 53b1 through 53b4, so as to form the electrode pads 20b, 51c1 through 51c4, 52c1 through 52c4 and 53c1 through 53c4. Therefore, the aforementioned respective sections formed on the substrate 10 are composed of the low-resistance layer C that is insulated from the substrate 10. The oscillator 20, the beams 33-1 through 33-4, the main frames 30-1 and 30-2, the sub-frames 30-3 and 30-4, the beams 42-1 through 42-4 and 43-1 through 43-4, and the comb-like electrodes 32a1 through 32a4, 32b1 through 32b4, 21a1 through 21a4 and 22a1 through 22a4 are located floating above the substrate 10 by the predetermined distance, and are oscillatably supported by the substrate 10 through the anchors 41-1 through 41-4.

Figure 3:
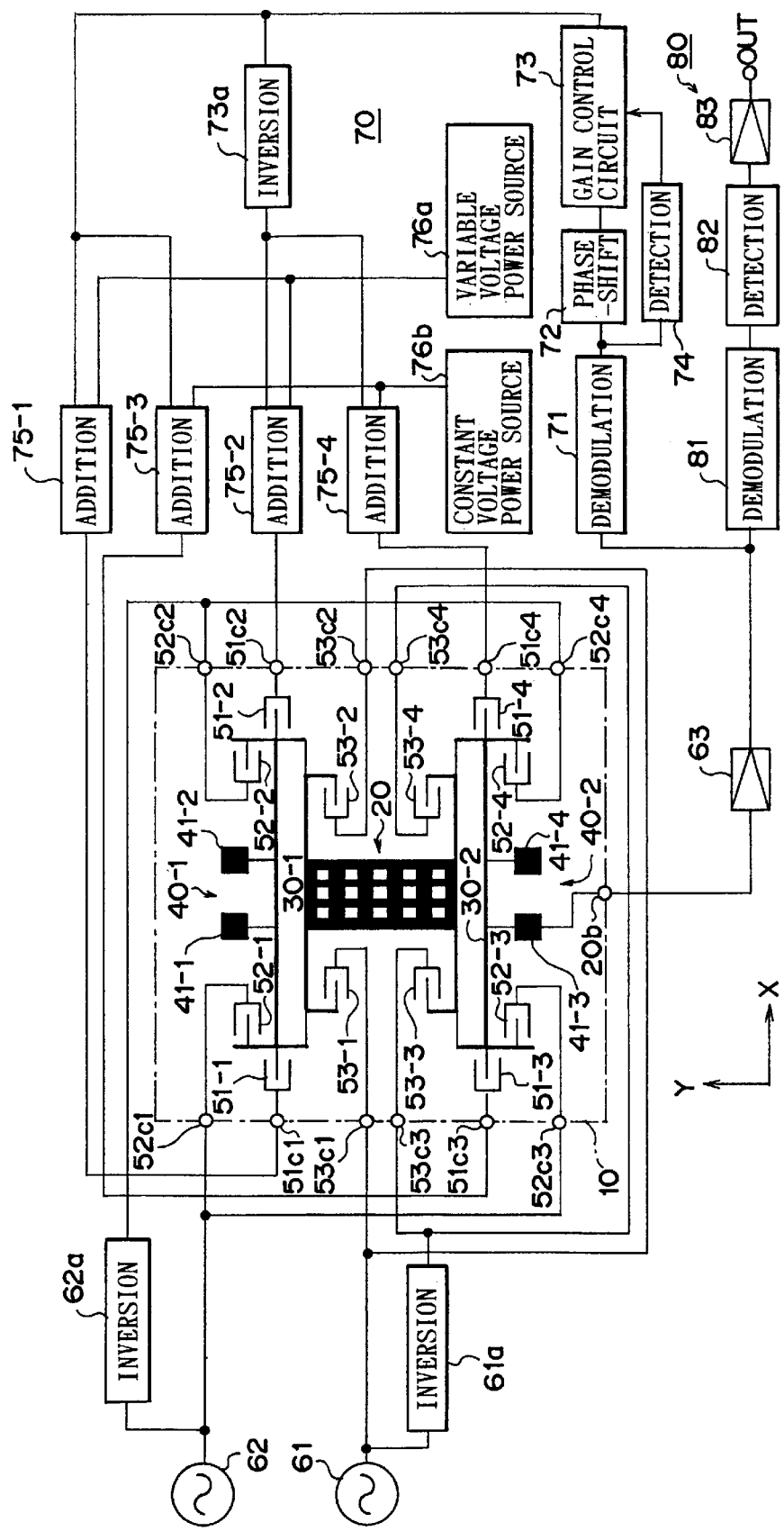
FIG. 3 is a block diagram of an electric circuit device for detecting angular rate using the angular rate detecting element according to the first embodiment of the present invention.

An electric circuit device for detecting angular rate using the angular rate detecting element having the aforementioned construction will now be described. FIG. 3 is a block diagram of the electric circuit device.

A high-frequency generator 61 is connected to the electrode pads 53c1 and 53c2 of the detection electrode portions 53-1 and 53-2. The generator 61 supplies the electrode pads 53c1 and 53c2 with a detection signal $E_1 \sin(2\pi f_1 t)$ having a frequency f1 that is much higher than a resonance frequency of the oscillator 20. A phase inversion circuit 61a is connected to the high-frequency generator 61. The phase inversion circuit 61a supplies the electrode pads 53c3 and 53c4 of the detection electrode portions 53-3 and 53-4 with a detection signal $E_1 \sin(2\pi f_1 t+\pi)$, whose phase is the inverse of the phase of the aforementioned detection signal $E_1 \sin(2\pi f_1 t)$.

A high-frequency generator 62 is connected to the electrode pads 52c1 and 52c3 of the drive monitor electrode portions 52-1 and 52-3. The generator 62 supplies the electrode pads 52c1 and 52c3 with a monitor signal $E_2 \sin(2\pi f_2 t)$ having a frequency $f_2$ that is much higher than the resonance frequency of the oscillator 20 and different from the frequency $f_1$. A phase inversion circuit 62a is connected to the high-frequency generator 62. The phase inversion circuit 62a supplies the electrode pads 52c2 and 52c4 of the drive monitor electrode portions 52-2 and 52-4 with a monitor signal $E_2 \sin(2\pi f_2 t+\pi)$, whose phase is the inverse of the phase of the monitor signal $E_2 \sin(2\pi f_2 t)$. Thus, if it is assumed that $E_{0x} \sin(2\pi f_0 t)$ and $E_{0y} \sin(2\pi f_{0t})$ represent oscillations in the directions of the X and Y axes respectively, the signals outputted from the electrode pad 20b to indicate the oscillations are referred to as $E_2 \times E_{0x} \times \sin(2f_0 t) \times \sin(2\pi f_2 t)$ and $E_1 \times E_{0y} \times \sin(2\pi f_0 t) \times \sin(2\pi f_1 t)$ respectively. The frequency $f_0$ is close to the resonance frequency of the oscillator 20.

A drive circuit 70 is connected to the respective electrode pads 51c1 through 51c4 of the drive electrode portions 51-1 through 51-4. The drive circuit 70 forms a drive signal based on a signal inputted from the electrode pad 20b through an amplifier 63 and supplies the drive signal to the respective electrode pads 51c1 through 51c4.

The drive circuit 70 is provided with a demodulation circuit 71, a phase-shift circuit 72 and a gain control circuit 73, which are connected to the amplifier 63 in series. The drive circuit 70 is also provided with a detection circuit 74, which is connected to the demodulation circuit 71 and controls gain of the gain control circuit 73. The demodulation circuit 71 synchronously detects a signal outputted from the electrode pad 20b with the frequency $f_2$ (retrieves an amplitude envelope of a signal with a frequency of $2\pi f_2$), and outputs a signal $E_{0x} \sin(2\pi f_0 t)$ indicative of an oscillation component of the oscillator 20 in the direction of the X-axis. The phase-shift circuit 72 advances the phase of an inputted signal by $\pi/2$, so as to correct delay of the detection signal indicative of oscillation of the oscillator 20 with respect to the signal for driving the oscillator 20 by $\pi/2$ (which corresponds to $1/8\pi f_0$ seconds). The detection circuit 74 synchronously detects a signal from the demodulator circuit 71 with the frequency fo (retrieves an amplitude envelope of the oscillation component of the oscillator 20 in the direction of the X-axis), and outputs a signal $E_{0x}$ indicative of the oscillation component of the oscillator 20 in the direction of the X-axis. The gain control circuit 73 outputs an output signal from the phase-shift circuit 72 after controlling the gain thereof in accordance with the signal $E_{0x}$ from the detection circuit 74, so that the amplitude of input signals of the phase-shift circuit 72 and the gain control circuit 73 (the amplitude of the oscillation component of the oscillator 20 in the direction of the X-axis) remains constant. That is, as the amplitude of the signal from the detection circuit 74 increases, the output signal from the gain control circuit 73 is controlled and outputted such that the amplitude thereof becomes smaller.

Further, the drive circuit 70 is provided with adders 75-1 and 75-3, which are connected to the output of the gain control circuit 73. The drive circuit 70 is also provided with adders 75-2 and 75-4, which are connected to the gain control circuit 73 through a phase inversion circuit 73a. The phase inversion circuit 73a inverts the phase of a signal from the gain control circuit 73 and outputs the signal. A variable-voltage power source circuit 76a, which outputs a DC voltage $E_T$ that is variably adjusted, is connected to the adders 75-1 and 75-2. A constant voltage power source circuit 76b, which outputs a constant DC voltage $E_B$, is connected to the adders 75-3 and 75-4.

The adder 75-1 adds the signal $E_{0x}' \sin(2\pi f_0 t)$ from the gain control circuit 73 to the DC voltage signal $E_T$ from the variable power source circuit 76a. Thus, the adder 75-1 supplies the electrode pad 51c1 of the drive electrode portion 51-1 with an added voltage $E_T+E_{0x}' \sin(2\pi f_0 t)$. The adder 75-2 adds the signal $E_{0x}' \sin(2\pi f_0 t+\pi)$ from the phase inversion circuit 73a to the DC voltage signal $E_T$ from the variable-voltage power source circuit 76a. Thus, the adder 75-2 supplies the electrode pad 51c2 of the drive electrode portion 51-2 with an added voltage $E_T+E_{0x}' \sin(2\pi f_0 t+\pi)$. The adder 75-3 adds the signal $E_{0x}' \sin(2\pi f_0 t)$ from the gain control circuit 73 to the DC voltage signal $E_B$ from the constant voltage power source circuit 76b. Thus, the adder 75-3 supplies the electrode pad 51c3 of the drive electrode portion 51-3 with an added voltage $E_B+E_{0x}' \sin(2\pi f_0 t)$. The adder 75-4 adds the signal $E_{0x}' \sin(2\pi f_0 t+\pi)$ from the phase inversion circuit 73a to the DC voltage signal $E_B$ from the constant voltage power source circuit 76b. Thus, the adder 75-4 supplies the electrode pad 51c4 of the drive electrode portion 51-4 with an added voltage $E_B+E_{Ox}'\sin(2f_0t+\pi)$.

Further, an output circuit 80 is connected to the amplifier 63. The output circuit 80 is composed of a demodulation circuit 81, a detection circuit 82 and an amplifier 83, which are connected in series. The demodulation circuit 81 synchronously detects a signal outputted from the electrode pad 20b with the frequency $f_1$ (retrieves an amplitude envelope of a signal with the frequency $f_1$), and outputs a signal $E_{0y}\sin(2\pi f_0 t)$ indicative of an oscillation component of the oscillator 20 in the direction of the Y-axis. The detection circuit 82 synchronously detects a signal from the demodulator circuit 81 with the frequency $f_0$ (retrieves an amplitude envelope of the oscillation component of the oscillator 20 in the direction of the Y-axis), and outputs a signal $E_{0y}$, indicative of the oscillation component of the oscillator 20 in the direction of the Y-axis. The amplifier 83 has the signal $E_{0y}$ inputted thereinto, and outputs from an output terminal OUT thereof a DC signal indicative of the magnitude of oscillation of the oscillator 20 in the direction of the Y-axis.

In the first embodiment constructed as described above, as shown in FIG. 3, the angular rate detecting element is first connected to the electric circuit device to constitute the angular rate detecting device, and the signal indicative of the magnitude of oscillation of the oscillator 20 in the direction of the Y-axis is then retrieved from the output terminal OUT in a state where the angular rate around the Z-axis is set to "0" prior to shipment of the device. In this case, since the angular rate is "0", the level of the aforementioned output signal must be "0". However, if not, the DC voltage signal $E_T$ is changed by adjusting the variable-voltage power source circuit 76a, so that the level of the output signal is settled down to "0".

This will be described in further details. That is, the drive voltage signals $E_T+E_{0y}'\sin(2\pi f_0 t)$ and $E_T+E_{0x}'\sin(2\pi f_0 t+\pi)=E_T-E_{0x}'\sin(2\pi f_0 t)$ are applied to the drive electrode portions 51-1 and 51-2, while the drive signals $E_B+E_{0x}'\sin(2\pi f_0 t)$ and $E_B+E_{0x}'\sin(2\pi f_0 t+\pi)=E_B-E_{0x}'\sin(2\pi f_0 t)$ are applied to the drive electrode portions 51-3 and 51-4. In the case where the angular rate detecting element is constructed with high precision, if the DC voltage signal $E_T$ from the variable-voltage power source circuit 76a is set equal to the DC voltage signal $E_B$ from the constant voltage power source circuit 76b, electrostatic attracting forces of an equal magnitude must act on the main frames 30-1 and 30-2 in the direction of the X-axis. Then, the main frames 30-1 and 30-2 must be synchronized in the direction of the X-axis with the oscillation frequency $f_0$, and must oscillate with an equal amplitude. The oscillation is also transmitted to the oscillator 20 through the beams 33-1 through 33-4, and the oscillator 20 must oscillate only in the direction of the X-axis. Accordingly, the level of the signal that is retrieved from the output terminal OUT and indicates the magnitude of oscillation of the oscillator 20 in the direction of the Y-axis must be settled down to "0".

In this case, owing to functions of the high-frequency generator 62, the phase inversion circuit 62a and the drive monitor electrode portions 52-1 through 52-4, the signal $E_2 \times E_{0x} \times \sin(2\pi f_0 t) \times \sin(2\pi f_2 t)$ indicative of an oscillation component in the direction of the X-axis is supplied to the drive circuit 70 through the electrode pad 20b and the amplifier 63. Then, the demodulation circuit 71, the detection circuit 74, the phase-shift circuit 72 and the gain control circuit 73, which constitute the drive circuit 70, operate such that the input signal $E_{0x}\sin(2\pi f_0 t)$ of the phase-shift circuit 72 and the gain control circuit 73, namely, the oscillation component from the electrode pad 20b in the direction of the X-axis remains constant with the lapse of time. Therefore, the oscillator 20 always oscillates with a constant amplitude.

On the other hand, in the case where the main frames 30-1 and 30-2 are not driven uniformly due to inconsistency of the respective members of the angular rate detecting element, especially due to processing inconsistency of the main frames 30-1 and 30-2, the beams 33-1 through 33-4, the drive electrode portions 51-1 through 51-4 and the like, even if the aforementioned DC voltage signals $E_T$ and $E_B$ are equal to each other, the oscillator 20 oscillates in the direction of the Y-axis. In the following description, attention will be focused on driving forces F1 and F2 that are applied to the main frames 30-1 and 30-2 respectively. The driving force F1 results from the drive voltage signals $E_T+E_{0x}'\sin(2\pi f_0 t)$ and $E_T-E_{0x}'\sin(2\pi f_0 t)$, and is expressed by a formula (1) shown below, wherein K represents a proportionality factor.

$$F1=K\times\{(E_T+E_{0x}'\sin(2\pi f_0 t))^2-(E_T-E_{0x}'\sin(2\pi f_0 t))^2\}=4\times K\times E_T\times E_{0x}'\sin(2\pi f_0 t) \quad (1)$$

The driving force F2 results from the drive voltage signals $E_B+E_{0x}'\sin(2\pi_0 t)$ and $E_B-E_{0x}'\sin(2\pi f_0 t)$, and is expressed by a formula (2) shown below.

$$F2=K\times\{(E_B+E_{0x}'\sin(2\pi f_0 t))^2-(E_B-E_{0x}'\sin(2\pi f_0 t))^2\}=4\times K\times E_B\times E_{0x}'\sin(2\pi f_0 t) \quad (2)$$

As can be understood from these formulas (1) and (2), the driving forces applied to the main frames 30-1 and 30-2 can be adjusted by changing the level of the DC voltage signal $E_T$ outputted from the variable-voltage power source circuit 76a. Thus, oscillation components of the oscillator 20 and the main frames 30-1 and 30-2 can be eliminated in the direction of the Y-axis.

As described hitherto, according to the first embodiment, the drive electrode portions 51-1 and 51-2 for driving the main frame 30-1 in the direction of the X-axis and the drive electrode portions 51-3 and 51-4 for driving the main frame 30-2 in the direction of the X-axis are each divided into a plurality of sections, and the drive voltage signals applied to the respective drive electrode portions 51-1 through 51-4 can be variably adjusted independently. Even if there is processing inconsistency in the main frames 30-1 and 30-2, the beams 33-1 through 33-4 and the drive electrode portions 51-1 through 51-4, the oscillator 20 can be prevented easily from oscillating in the direction of the Y-axis unintentionally due to the processing inconsistency.

Next, the operation of detecting an angular rate around the Z-axis by means of the angular rate detecting device after completion of the aforementioned adjustment will be described. First of all, the angular rate detecting device is fixed to an object of detection, and the electric circuit device is operated as described above. In this state, if there is generated an angular rate around the Z-axis, the oscillator 20 starts oscillating in the direction of the Y-axis with an amplitude proportional to the angular rate because of a Coriolis force.

In this case, because of oscillation of the oscillator 20 in the direction of the Y-axis, the electrostatic capacities of the detection electrode portions 53-1 through 53-4 change in accordance with the oscillation. Due to the changes in electrostatic capacity, a signal $E_1\times E_{0y}\times\sin(2\pi f_0 t)\times\sin(2\pi f_1 t)$ is supplied to the electrode pad 20b. This signal is obtained by modulating the amplitude of the detection signals $E_1\sin(2\pi f_1 t)$ and $E_1\sin(2\pi f_1 t+\pi)=E_1\sin(2\pi f_1 t\pi)$, which are outputted from the high-frequency generator 61 and the phase inversion circuit 61a. The signal supplied to the electrode pad 20b is then outputted to the output circuit 80 through the amplifier 63. Through operations of the demodulation circuit 81, the detection circuit 82 and the amplifier 83, the output circuit 80 outputs from the output terminal OUT a signal $E_{0y}$ indicative of the magnitude of oscillation of the oscillator 20 in the direction of the Y-axis. The magnitude of oscillation of the oscillator 20 in the direction of the Y-axis is proportional to the angular rate around the Z-axis. Therefore, the detection signal indicative of the angular rate is outputted from the output terminal OUT.

As described above, according to the angular rate detecting element of the first embodiment, the oscillator 20, the main frames 30-1 and 30-2 and the sub-frames 30-3 and 30-4 are supported over the substrate 10 such that they can oscillate in the direction of the X-axis, by the beams 42-1 through 42-4 and 43-1 through 43-4, which extend in the direction of the Y-axis and function as driving beams (supporting members). Also, the oscillator 20 is supported over the substrate 10 such that it can oscillate in the direction of the Y-axis, by the beams 33-1 through 33-4, which extend in the direction of the X-axis and function as detecting beams (supporting members). Disposed on the substrate 10 are the drive electrode portions 51-1 through 51-4, which are arranged at different locations along the Y-axis and are capable of driving the oscillator 20, the main frames 30-1 and 30-2 and the sub-frames 30-3 and 30-4 independently in the direction of the X-axis. The drive circuit 70 is designed to adjust respective driving forces generated by the drive electrode portions 51-1 through 51-4. Therefore, even if there is processing inconsistency in the respective portions of the angular rate detecting element, the oscillator 20, the main frames 30-1 and 30-2 and the sub-frames 30-3 and 30-4 can be made to oscillate in the direction of the X-axis with high precision as well as good stability. Also, the angular rate around the Z-axis can be detected precisely.

Further, as described above, the main frames 30-1 and 30-2 are divided into a plurality of sections in the direction of the Y-axis, instead of entirely surrounding the oscillator 20. The main frames 30-1 and 30-2 are elastically connected by the beams 33-1 through 33-4 through the oscillator 20. Thus, even if the substrate 10 is deformed, for example, warped in the direction of the Y-axis owing to external factors such as changes in temperature or external forces, such deformation is absorbed by the beams 33-1 through 33-4. Thus, it is possible to inhibit the main frames 30-1 and 30-2 from interfering with each other, and to damp down amounts of deformation of the beams 42-1 through 42-4 and 43-1 through 43-4. Consequently, it is possible to reliably inhibit internal stress from being generated in the beams 42-1 through 42-4 and 43-1 through 43-4 due to the aforementioned external factors. Besides, it is possible to ensure linearity of spring constants of the driving beams. Still further, since the maximum amounts of deformation of the beams 42-1 through 42-4 and 43-1 through 43-4 can be increased, the oscillator 20 can be made to oscillate with a great amplitude in the direction of the X-axis with high precision as well as good stability. Also in this respect, the precision in detection of angular rate around the Z-axis can be enhanced.

Figure 4:
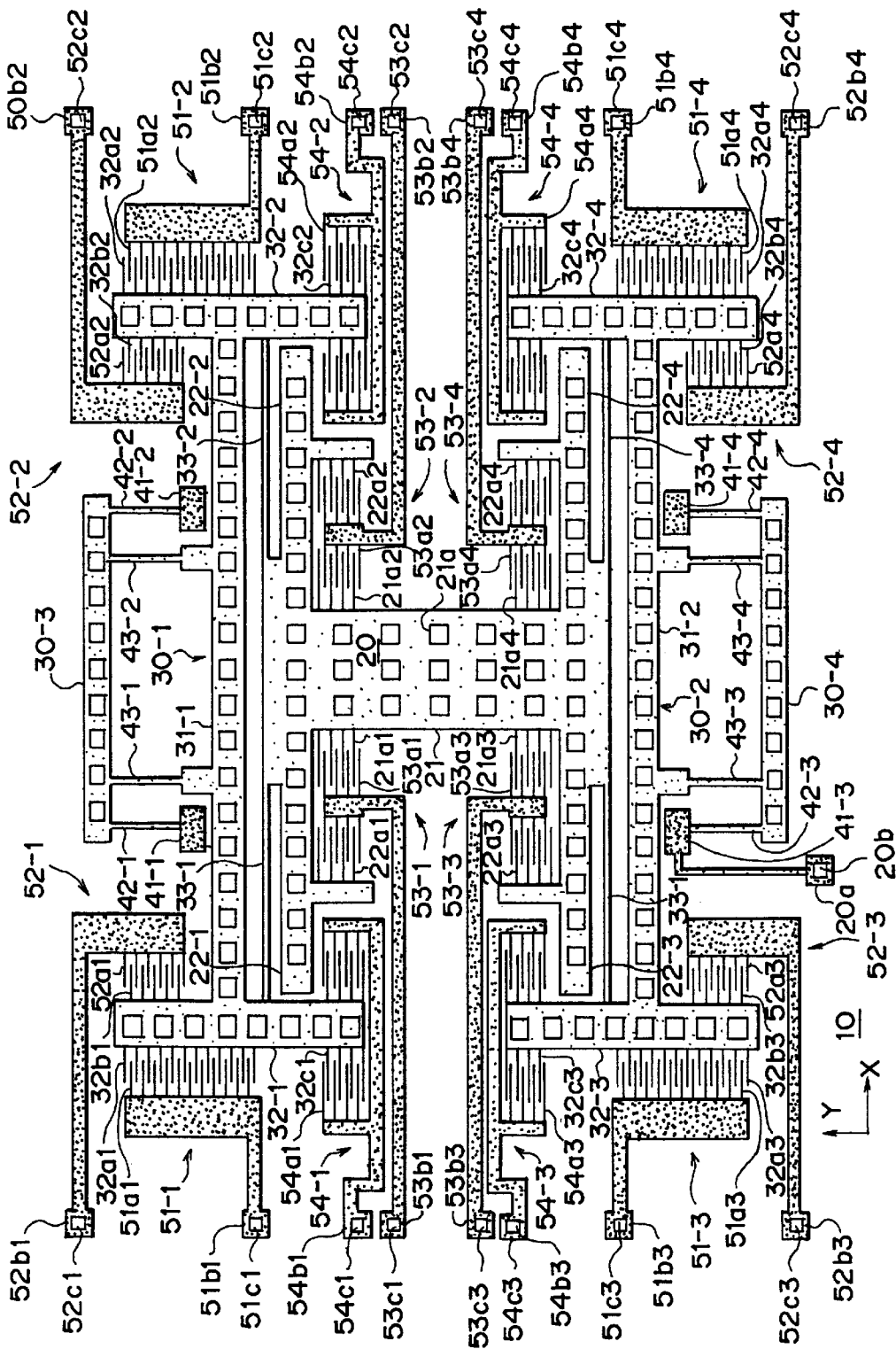
FIG. 4 is a plan view of an angular rate detecting element according to a second embodiment of the present invention.

An angular rate detecting device according to a second embodiment of the present invention will now be described. FIG. 4 shows in plan view the angular rate detecting element according to the second embodiment, in the same manner as in FIG. 1. This angular rate detecting element is characterized by including correction electrode portions 54-1 through 54-4 in addition to the members of the aforementioned angular rate detecting element of the first embodiment. The correction electrode portion 54-1 and 54-2 counterbalance the effects of diagonal oscillation (the oscillation components in the direction of the Y-axis) of the main frames 30-1 caused by the driving thereof, while the correction electrode portion 54-3 and 54-4 counterbalance the effects of diagonal oscillation (the oscillation components in the direction of the Y-axis) of the main frames 30-2 caused by the driving thereof. All the other components of the second embodiment are identical to those of the first embodiment. Therefore, these components will be marked with the same reference numerals as in the first embodiment and will not be described in any further details.

The correction electrode portions 54-1 through 54-4 are provided with comb-like electrodes 54a1 through 54a4 respectively, each of which is composed of a plurality of electrodes. The comb-like electrodes 54a1 and 54a2 are located inwardly of the terminal portions 32-1 and 32-2 of the main frame 30-1 respectively in the direction of the Y-axis and extend both outwardly and inwardly in the direction of the X-axis, while the comb-like electrodes 54a3 and 54a4 are located inwardly of the terminal portions 32-3 and 32-4 of the main frame 30-2 respectively in the direction of the Y-axis and extend both outwardly and inwardly in the direction of the X-axis. The comb-like electrodes 54a1 through 54a4 has their electrodes 54a1 through 54a4 respectively, to which pad portions 54b1 through 54b4 are connected respectively. That is, the comb-like electrodes 54a1 through 54a4 are formed integrally with the pad portions 54b1 through 54b4 respectively, and attached to the upper face of the substrate 10. Disposed on upper faces of the pad portions 54b1 through 54b4 are electrode pads 54c1 through 54c4 respectively, which are made of a conductive metal (e.g. aluminum). The terminal portions 32-1 through 32-4 are provided with comb-like electrodes 32c1 through 32c4 respectively, each of which is composed of a plurality of electrodes. The comb-like electrodes 32c1 through 32c4 extend both inwardly and outwardly in the direction of the X-axis and are located opposite the comb-like electrodes 54a1 through 54a4 respectively as well as inwardly of the terminal portions 32-1 through 32-4 respectively in the direction of the Y-axis. The comb-like electrodes 32c1 and 32c2 and the comb-like electrodes 32c3 and 32c4, which are formed integrally with the main frames 30-1 and 30-2 respectively, are disposed in such a manner as to float above the upper face of the substrate 10 by a predetermined distance. Each of the electrodes of each of the comb-like electrodes 32c1 through 32c4 reaches a position between corresponding adjacent ones of the electrodes of each of the comb-like electrodes 54a1 through 54a4, and is located opposite the adjacent electrodes.

Also in this case, each of the electrodes of the comb-like electrodes 32c1 through 32c4 is offset towards one side from a central position between corresponding adjacent ones of each of the comb-like electrodes 54a1 through 54a4. However, in this case, the direction in which the respective electrodes of the comb-like electrodes 32c1 through 32c4 are offset is opposite to the direction in which each of the electrodes of the comb-like electrodes 21a1 through 21a4 and 22a1 through 22a4 is offset with respect to a corresponding one of the electrodes of each of the comb-like electrodes 54a1 through 54a4 of the detection electrode portions 53-1 through 53-4. Therefore, in this case, the change in capacitance of the correction electrode portions 54-1 through 54-4 resulting from displacement of the main frames 30-1 and 30-2 toward one side in the Y-axis direction is directionally opposite to the change in capacitance of the detection electrode portions 53-1 through 53-4 resulting from displacement of the oscillator 20 toward the same side in the direction of the Y-axis. In other words, if the correction electrode portions 54-1 through 54-4 increase (or decrease) in capacitance in response to displacement of the main frames 30-1 and 30-2 and the oscillator 20 toward one side in the direction of the Y-axis, the detection electrode portions 53-1 through 53-4 decrease (increase) in capacitance. The change in capacitance of the correction electrode portions 54-1 through 54-4, which is caused by unintended oscillation of the main frames 30-1 and 30-2 in the direction of the Y-axis, needs to be directionally opposite to and quantitatively equal to the change in capacitance of the detection electrode portions 53-1 through 53-4, which is caused by unintended oscillation of the oscillator 20 in the direction of the Y-axis. The correction electrode portions 54-1 through 54-4 and the detection electrode portions 53-1 through 53-4 need to be designed to accomplish such directional oppositeness and qualitative equality.

Figure 5:
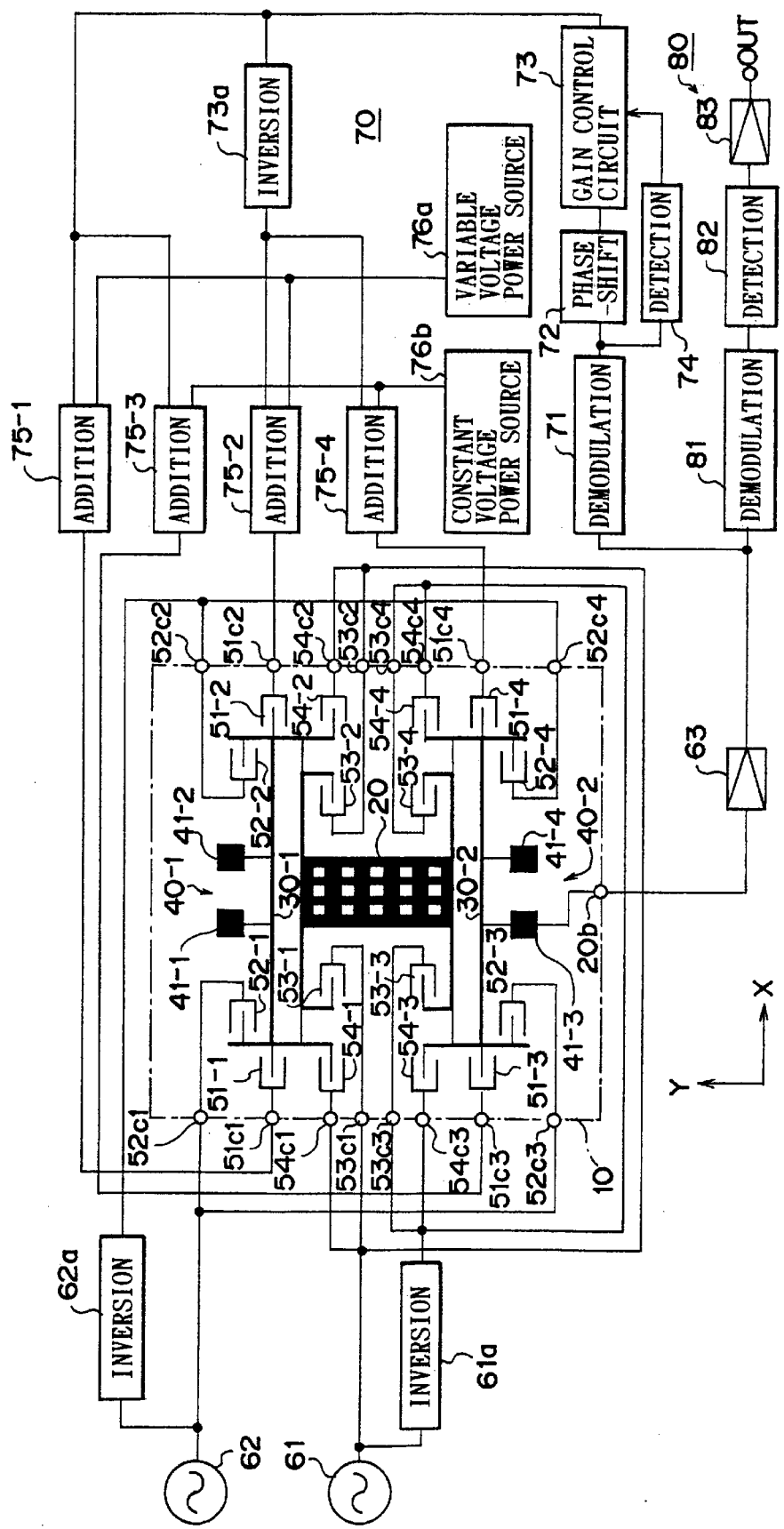
FIG. 5 is a block diagram of a first electric circuit device for detecting angular rate using the angular rate detecting element according to the second embodiment of the present invention.

Next, a first electric circuit device connected to this angular rate detecting element will be described. FIG. 5 is a block diagram of the electric circuit device.

In this electric circuit device, the electrode pads 54c1 and 54c2 for the correction electrode portions 54-1 and 54-2 and the electrode pads 53c1 and 53c2 for the detection electrode portions 53-1 and 53-2 are commonly connected to the output of the high-frequency generator 61. Further, the electrode pads 54c3 and 54c4 for the correction electrode portions 54-3 and 54-4 and the electrode pads 53c3 and 53c4 for the detection electrode portions 53-3 and 53-4 are commonly connected to the output of the phase inversion circuit 61a. The other circuits are constructed in the same manner as those of the first embodiment. Therefore, the components of these circuits will be marked with the same reference numerals as in the first embodiment and will not be described in any further details.

The thus-constructed angular rate detecting device of the second embodiment serves to detect angular rate around the Z-axis, as is the case with the first embodiment. However, in this case, the correction electrode portions 54-1 through 54-4 function as follows.

That is, in the case where the main frames 30-1 and 30-2 and the oscillator 20 oscillate with respect to the substrate 10 diagonally to the direction of the X-axis due to the driving of the drive electrode portions 51-1 through 51-4, even if the angular rate around the Z-axis is zero, there is an oscillation component in the direction of the Y-axis present at the output terminal OUT. However, in this case, the high-frequency generator 61 outputs a high-frequency detection signal, which is supplied to the comb-like electrodes 53a1 and 53a2 of the detection electrode portions 53-1 and 53-2 as well as to the comb-like electrodes 54a1 and 54a2 of the correction electrode portions 54-1 and 54-2. Further, the phase inversion circuit 61a outputs a signal whose phase is the inverse of the aforementioned high-frequency signal. The signal from the phase inversion circuit 61a is supplied to the comb-like electrodes 53a3 and 53a4 of the detection electrode portions 53-3 and 53-4 as well as to the comb-like electrodes 54a3 and 54a4 of the correction electrode portions 54-3 and 54-4. As described above, if the main frames 30-1 and 30-2 and the oscillator 20 are displaced toward one side in the direction of the Y-axis, the correction electrode portions 54-1 through 54-4 and the detection electrode portions 53-1 through 53-4 change in capacitance in opposed directions. Hence, if the oscillator 20 and the main frames 30-1 and 30-2 oscillate at the same time diagonally to the direction of the X-axis, the change amounts in capacitance of the correction electrode portions 54-1 through 54-4 resulting from the oscillation components of the main frames 30-1 and 30-2 in the direction of the Y-axis are removed from the change amounts in capacitance of the detection electrode portions 53-1 through 53-4 resulting from the oscillation component of the oscillator 20 in the direction of the Y-axis respectively.

On the other hand, the main frames 30-1 and 30-2 are designed to be unlikely to oscillate in the direction of the Y-axis owing to the functions of the beams 42-1 through 42-4 and 43-1 through 43-4 as supporting members. The oscillator 20 is designed to tend to oscillate integrally with the main frames 30-1 and 30-2 in the direction of the X-axis and to tend to oscillate independently of the main frames 30-1 and 30-2 in the direction of the Y-axis, owing to the functions of the beams 33-1 through 33-4 as supporting members. Therefore, in response to a certain angular rate around the Z-axis, only the oscillator 20 oscillates in the direction of the Y-axis due to a Coriolis force with an amplitude proportional to the Coriolis force. As a result, even if the oscillator 20 is driven diagonally to the direction of the X-axis due to processing inconsistency of the respective members on the substrate 10, especially due to processing inconsistency of the main frames 30-1 and 30-2, the effect of diagonal oscillation of the oscillator 20 caused by the driving thereof is eliminated. Thus, the angular rate can be detected with high precision.

Figure 6:
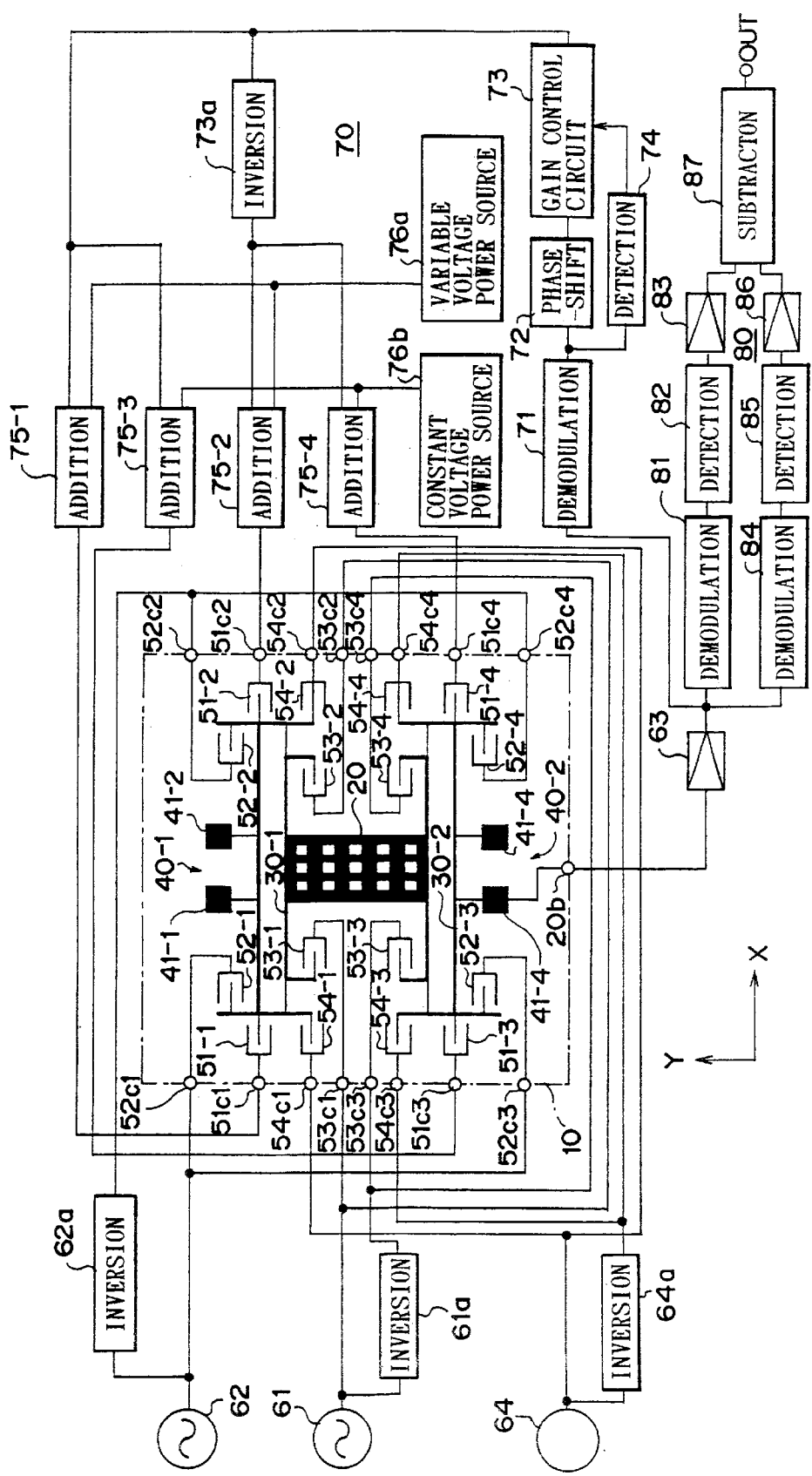
FIG. 6 is a block diagram of a second electric circuit device for detecting angular rate using the angular rate detecting element according to the second embodiment of the present invention.

Next, a second electric circuit device connected to the angular rate detecting element of the second embodiment will be described. FIG. 6 is a block diagram of the electric circuit device.

In this electric circuit device, the electrode pads 54c1 and 54c2 for the correction electrode portions 54-1 and 54-2 are connected to the output of a high-frequency generator 64. Further, the electrode pads 54c3 and 54c4 for the correction electrode portions 54-3 and 54-4 are connected to the output of a phase inversion circuit 64a, which inverts the phase of an output from the high-frequency generator 64. The high frequency generator 64 and the phase inversion circuit 64a are designed to detect changes in capacitance of the correction electrode portions 54-1 and 54-2. The generator 64 outputs a correction electrode signal $E_3 \sin(2\pi f_3 t)$ with a frequency $f_3$, which is different from the respective oscillation frequencies $f_i$ and $f_2$ of the high frequency generators 61 and 62 and much higher than the resonance frequency of the oscillator 20.

In this electric circuit device, a demodulation circuit 84, a detection circuit 85 and an amplifier 86 are connected to the output of the amplifier 63 in parallel with the demodulation circuit 81, the detection circuit 82 and the amplifier 83. The demodulation circuit 84 synchronously detects a signal outputted from the electrode pad 20b with the frequency $f_3$ (retrieves an amplitude envelope of a signal with the frequency $f_3$) and outputs a signal $E_{3y} \sin(2\pi f_0 t)$ indicative of an oscillation component of the main frames 30-1 and 30-2 in the direction of the Y-axis. The detection circuit 85 synchronously detects a signal from the demodulation circuit 84 with the frequency F0 (retrieves amplitude envelopes of oscillation components of the main frames 30-1 and 30-2 in the direction of the Y-axis), and outputs a signal $E_{3y}$ indicative of the amplitudes of the oscillation components of the main frames 30-1 and 30-2 in the direction of the Y-axis. A subtracter 87, which subtracts an output value $E_{3y}$ of the amplifier 86 from an output value $E_{oy}$ of the amplifier 83 and outputs the result, is connected between the amplifiers 83 and 86 and the output terminal OUT.

The thus-constructed angular rate detecting device also detects angular rate around the Z-axis, as is the case with the first embodiment. Also in this case, the oscillation components of the main frames 30-1 and 30-2 in the direction of the Y-axis, which components are detected by the correction electrode portions 54-1 through 54-4, are used to eliminate the oscillation component of the oscillator 20 in the direction of the Y-axis caused by the driving thereof.

That is, in the case where the main frames 30-1 and 30-2 and the oscillator 20 oscillate with respect to the substrate 10 diagonally to the direction of the X-axis due to the driving of the drive electrode portions 51-1 through 51-4, the amplitude values of the oscillation components of the main frames 30-1 and 30-2 in the direction of the Y-axis during the diagonal oscillation are retrieved as an output value $E_{3y}$ owing to the functions of the demodulation circuit 84, the detection circuit 85 and the amplifier 86. The subtracter 87 then subtracts the output value $E_{3y}$ from an output value $E_{0y}$ of the amplifier 83 indicating the magnitude of oscillation of the oscillator 20 in the direction of the Y-axis. The resultant value is then outputted from the output terminal OUT. On the other hand, the output value $E_{0y}$, which is retrieved from the amplifier 83 and indicates oscillation of the oscillator 20 in the direction of the Y-axis, includes, in addition to the oscillation component resulting from the angular rate around the Z-axis, unintended oscillation components resulting from diagonal oscillation of the main frames 30-1 and 30-2. The subtraction by the subtracter 87 serves to eliminate the unintended oscillation components.

Therefore, the angular rate detecting device employing the second electric circuit device is also designed such that even if the oscillator 20 is driven diagonally to the direction of the X-axis due to processing inconsistency of the respective members on the substrate 10, especially due to processing inconsistency of the main frames 30-1 and 30-2, the effect of diagonal oscillation of the oscillator 20 due to the driving thereof is eliminated. Consequently, the angular rate can be detected with high precision.

In the first electric circuit device of the angular rate detecting device according to the second embodiment, the change in capacitance of the correction electrode portions 54-1 through 54-4, which is caused by unintended oscillation of the main frames 30-1 and 30-2 in the direction of the Y-axis, needs to be directionally opposite to and quantitatively equal to the change in capacitance of the detection electrode portions 53-1 through 53-4, which is caused by unintended oscillation of the oscillator 20 in the direction of the Y-axis. The correction electrode portions 54-1 through 54-4 and the detection electrode portions 53-1 through 53-4 need to be designed to accomplish such directional oppositeness and qualitative equality. However, in the case where the second electric circuit device is applied to the angular rate detecting device, even if the change amounts in capacitance of the correction electrode portions 54-1 through 54-4 and the detection electrode portions 53-1 through 53-4 are quantitatively different, the unintended oscillation component of the oscillator 20 in the direction of the Y-axis can be eliminated through adjustment of gains of the amplifiers 83 and 86.

In the case where the angular rate detecting element is applied to the second electric circuit device, the changes in capacitance of the correction electrode portions 54-1 through 54-4 need not be directionally opposite to the changes in capacitance of the detection electrode portions 53-1 through 53-4. Thus, in this case, the direction in which each of the electrodes of the comb-like electrodes 32c1 through 32c4 is offset from a central position between corresponding adjacent ones of the electrodes of the comb-like electrodes 54a1 through 54a4 may be either identical to or opposite to the direction in which each of the electrodes of the comb-like electrodes 21a1 through 21a4 and 22a1 through 22a4 is offset from a central position between corresponding adjacent ones of the electrodes of the comb-like electrodes 53a1 through 53a4.

Figure 7:
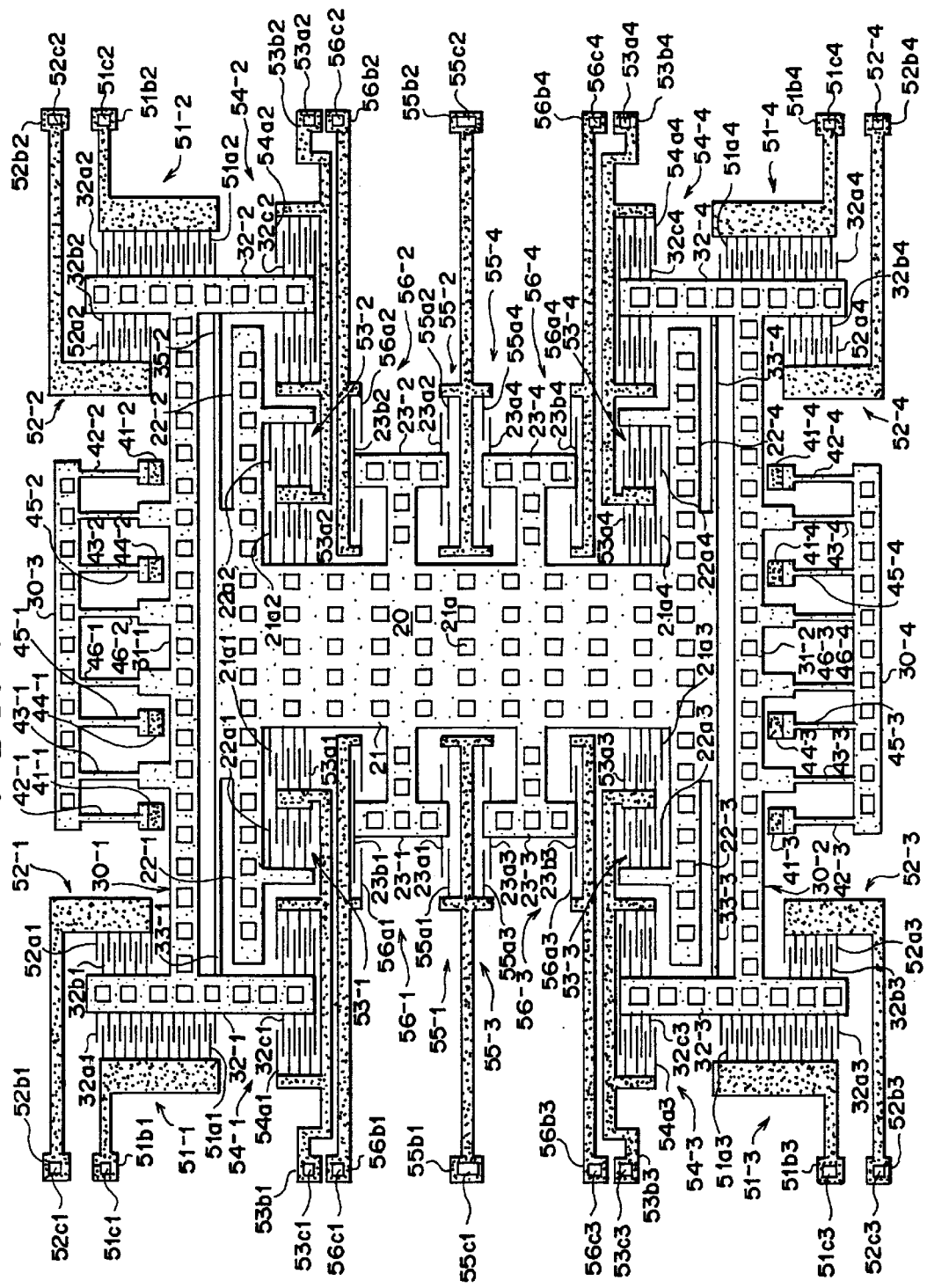
FIG. 7 is a plan view of an angular rate detecting element according to a third embodiment of the present invention.

An angular rate detecting device according to a third embodiment of the present invention will now be described. FIG. 7 shows in plan view the angular rate detecting element according to the third embodiment, in the same manner as in FIGS. 1 and 4. This angular rate detecting element is different from that of the second embodiment in the following respects. That is, the main frames 30-1 and 30-2 and the sub-frames 30-3 and 30-4 are supported differently with respect to the substrate 10. Also, the angular rate detecting element of the third embodiment is provided with adjustment electrode portions 55-1 through 55-4 for adjusting resonance frequency of the oscillator 20 and servo electrode portions 56-1 through 56-4 for counterbalancing oscillation of the oscillator 20 in the direction of the Y-axis. Further, the pad portions 54b1 through 54b4 for the correction electrode portions 54-1 through 54-4 in the angular rate detecting element of the second embodiment are omitted. The correction electrode portions 54-1 through 54-4 are also commonly connected to the pad portions 53b1 through 53b4 of the detection electrode portions 53-1 through 53-4 respectively. This is operationally equivalent to the case where the pad portions 53b1 through 53b4 of the detection electrode portions 53-1 through 53-4 are connected to the pad portions 54b1 through 54b4 of the correction electrode portions 54-1 through 54-4 respectively outwardly of the substrate 10, as is the case with the first electric circuit device (FIG. 5) of the aforementioned second embodiment. All the other components of the third embodiment are identical to those of the second embodiment. Therefore, these components will be marked with the same reference numerals as in the second embodiment and will not be described in any further details.

First of all, a supporting structure for supporting the main frames 30-1 and 30-2 and the sub-frames 30-3 and 30-4 with respect to the substrate 10 will be described. A set of supporting members composed of an anchor 44-1 and beams 45-1 and 46-1 and a set of supporting members composed of an anchor 44-2 and beams 45-2 and 46-2 are provided between a set of supporting members composed of the anchor 41-1 and the beams 42-1 and 43-1 and a set of supporting members composed of the anchor 41-2 and the beams 42-2 and 43-2 respectively. The anchors 41-1 and 41-2 and the beams 42-1, 42-2, 43-1 and 43-2 are the same as those of the second embodiment.

The beams 45-1 and 45-2 extend in the direction of the Y-axis. The beams 45-1 and 45-2 are connected at their inner ends in the direction of the Y-axis to the anchors 44-1 and 44-2 respectively, and connected at their outer ends in the direction of the Y-axis to the respective inner ends of the sub-frame 30-3. The beams 46-1 and 46-2 also extend in the direction of the Y-axis. The beams 46-1 and 46-2 are connected at their inner ends in the direction of the Y-axis to the respective outer ends of the long-extension portion 31-1 of the main frame 30-1 in the direction of the Y-axis, and connected at their outer ends in the direction of the Y-axis to the respective inner ends of the sub-frame 30-3 in the direction of the Y-axis. As is the case with the beams 42-1, 42-2, 431 and 43-2, the beams 45-1, 45-2, 46-1 and 46-2 also have narrow widths and are disposed in such a manner as to float above the substrate 10 by a predetermined distance.

In this case, the beams 42-1 and 42-2 are arranged at opposed end portions of the sub-frame 30-3 symmetrically with respect to a central position of the sub-frame 30-3 and the main frame 30-1 in the direction of the X-axis. The beams 43-1, 45-1 and 46-1 and the beams 43-2, 45-2 and 46-2 are also arranged symmetrically with respect to the central position of the sub-frame 30-3 and the main frame 30-1 in the direction of the X-axis respectively. All these beams 42-1, 42-2, 43-1, 43-2, 45-1, 45-2, 46-1 and 46-2 are structurally identical in length, width and spring constant. It is preferable that all the beams 42-1, 42-2, 43-1, 43-2, 45-1, 45-2, 46-1 and 46-2 be arranged substantially at equal intervals in the direction of the X-axis.

Figure 8:
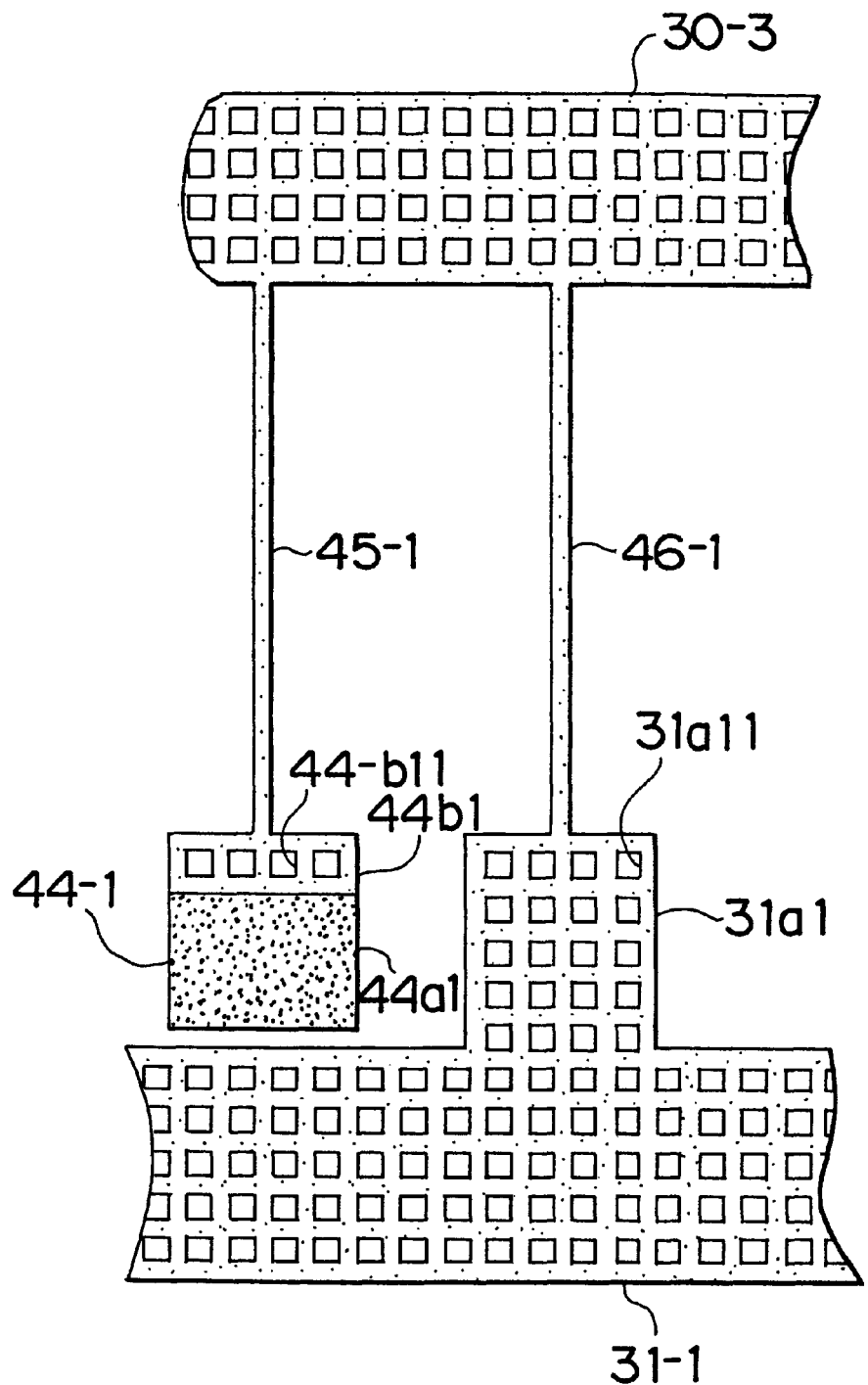
FIG. 8 is an enlarged partial view of a supporting structure of a main frame shown in FIG. 7.

Furthermore, all the beams 42-1, 42-2, 43-1, 43-2, 45-1, 45-2, 46-1 and 46-2 have the same spring constant. In order to ensure that the main frame 30-1 and the sub-frame 30-3 oscillate precisely in the direction of the X-axis, the connecting structure of those beams is ingeniously contrived. This structure will be described with reference to FIG. 8, adducing an example of the beams 45-1 and 46-1. In order to fit the connecting structure between the beam 45-1 and the anchor 44-1 to the connecting structure between the beam 46-1 and the long-extension portion 31-1 of the main frame 30-1, the anchor 44-1 is composed of an attachment portion 44a1 attached to the substrate 10 and a connecting portion 44b1 floating above the upper face of the substrate 10 and having the same width as the attachment portion 44a1 in the direction of the X-axis. Formed on the side of the long-extension portion 31-1 is a connecting portion 31a1, which has the same width as the anchor 44-1 in the direction of the X-axis and floats above the upper face of the substrate 10. The connecting portions 44b1 and 31a1 are provided with through holes 44b1 and 31a11 respectively, which are identical in shape. In the direction of the X-axis, the number of the through holes 44b11 provided is equal to the number of the through holes 31a11 provided. The other anchors 41-1, 41-2 and 44-2 and the other beams 42-1, 42-2, 43-1, 43-2, 45-2 and 46-2 are also constructed in the same manner as the anchor 44-1 and the beams 45-1 and 46-1 respectively.

Provided also on the side of the main frame 30-2 and the sub-frame 30-4 is a supporting member composed of the anchors 41-3, 41-4, 44-3 and 44-4 and the beams 42-3, 42-4, 43-3, 45-3, 45-4, 46-3 and 46-4, which is constructed in the same manner as the supporting member composed of the anchors 41-1, 41-2, 44-1 and 44-2 and the beams 42-1, 42-2, 43-1, 43-2, 45-1, 45-2, 46-1 and 46-2. These supporting members are arranged symmetrically with respect to the central position of the angular rate detecting element in the direction of the Y-axis.

Thus, according to the third embodiment, a multitude of driving beams 42-1 through 42-4, 43-1 through 43-4, 45-1 through 45-4 and 46-1 through 46-4 are provided so as to cause the oscillator 20 and the main frames 30-1 and 30-2 to oscillate in the direction of the direction of the X-axis. Accordingly, when the oscillator 20 and the main frames 30-1 and 30-2 oscillate, the stress applied to each of the beams can be kept small. As a result, the linearity of the spring constants of the beams 42-1 through 42-4, 43-1 through 43-4, 45-1 through 45-4 and 46-1 through 46-4 can be maintained sufficiently. Besides, the maximum deformation amounts of those beams can be kept large. Accordingly, it becomes possible to cause the oscillator 20 to oscillate in the direction of the X-axis with a great amplitude with high precision as well as good stability. In the third embodiment, four pairs of beams and anchors are provided to support each of the main frames 30-1 and 30-2. However, three, five or more pairs of beams and anchors may be provided to support each of the main frames 30-1 and 30-2.

In the third embodiment, the respective beams 42-1 through 42-4, 43-1 through 43-4, 45-1 through 45-4 and 46-1 through 46-4 have the substantially same structure. Therefore, when the oscillator 20 and the main frames 30-1 and 30-2 oscillate, the stresses applied to the respective beams can be made homogeneous. Thus, the linearity of the spring constants of the beams 42-1 through 42-4, 43-1 through 43-4, 45-1 through 45-4 and 46-1 through 46-4 can be maintained sufficiently. Besides, the maximum deformation amounts of those beams can be kept large, and precise and stable oscillation of the oscillator 20 and the main frames 30-1 and 30-2 in the direction of the X-axis can be ensured. As a result, the precision in detecting angular rate can be enhanced. Furthermore, the sub-frames 30-3 and 30-4 function as reinforcing members for the beams 42-1 through 42-4, 43-1 through 43-4, 45-1 through 45-4 and 46-1 through 46-4 in case of displacement of the main frames 30-1 and 30-2 in a direction other than that of the X-axis. Therefore, it can be ensured that the oscillator 20 and the main frames 30-1 and 30-2 oscillate in the direction of the X-axis precisely and stably, and the precision in detecting angular rate can be enhanced.

Next, the adjustment electrode portions 55-1 through 55-4 and the servo electrode portions 56-1 through 56-4 will be described. The adjustment electrode portions 55-1 through 55-4 are disposed outwardly of the mass portion 21 of the oscillator 20 in the direction of the X-axis. The adjustment electrode portions 55-1 through 55-4 are provided with pairs of electrodes 55a1 through 55a4 respectively. The electrodes 55a1 through 55a4 are provided at the central portion of the substrate 10 in the direction of the Y-axis, and extend in the direction of the X-axis. The electrodes 55a1 and 55a3 are formed integrally with a pad portion 55b1 and attached to the upper face of the substrate 10. The pad portion 55b1 is commonly connected to the electrodes 55a1 and 55a3. The electrodes 55a2 and 55a4 are formed integrally with a pad portion 55b2 and attached to the upper face of the substrate 10. The pad portion 55b2 is commonly connected to the electrodes 55a2 and 55a4. Disposed respectively on the upper faces of the pad portions 55b1 and 55b2 are electrode pads 55c1 and 55c2, which are made of a conductive metal (e.g. aluminum).

Pairs of electrodes 23a1 through 23a4 are provided opposed to the pairs of the electrodes 55a1 through 55a4 respectively in the direction of the Y-axis. The electrodes 23a1 through 23a4 oscillate integrally with the oscillator 20 and extend in the direction of the X-axis. The electrodes 23a1 through 23a4 are formed integrally with inner ends of T-shaped portions 23-1 through 23-4 respectively in the direction of the Y-axis. The T-shaped portions 23-1 through 23-4 project from opposed sides of the mass portion 21 of the oscillator 20 in the direction of the X-axis. The T-shaped portions 23-1 through 23-4 and the electrodes 23a1 through 23a4 are formed integrally with the oscillator 20, and disposed in such a manner as to float above the upper face of the substrate 10 by a predetermined distance.

The servo electrode portions 56-1 through 56-4 are provided with pairs of electrodes 56a1 through 56a4 respectively. The electrodes 56a1 through 56a4 are provided inwardly of the detection electrode portions 53-1 through 53-4 respectively in the direction of the Y-axis, and extend in the direction of the X-axis. The pairs of electrodes 56a1 through 56a4 are formed integrally with the pad portions 56b1 through 56b4 respectively, and attached to the upper face of the substrate 10. Disposed on the upper faces of the pad portions 56b1 through 56b4 are electrode pads 56c1 through 56c4, which are made of a conductive metal (e.g. aluminum).

Pairs of electrodes 23b1 through 23b4 are provided opposed to the pairs of the electrodes 56a1 through 56a4 respectively in the direction of the Y-axis. The electrodes 23b1 through 23b4 are formed integrally with outer ends of T-shaped portions 23-1 through 23-4 respectively in the direction of the Y-axis. The electrodes 23b1 through 23b4 are also formed integrally with the oscillator 20, and disposed in such a manner as to float above the upper face of the substrate 10 by a predetermined distance.

Figure 9:
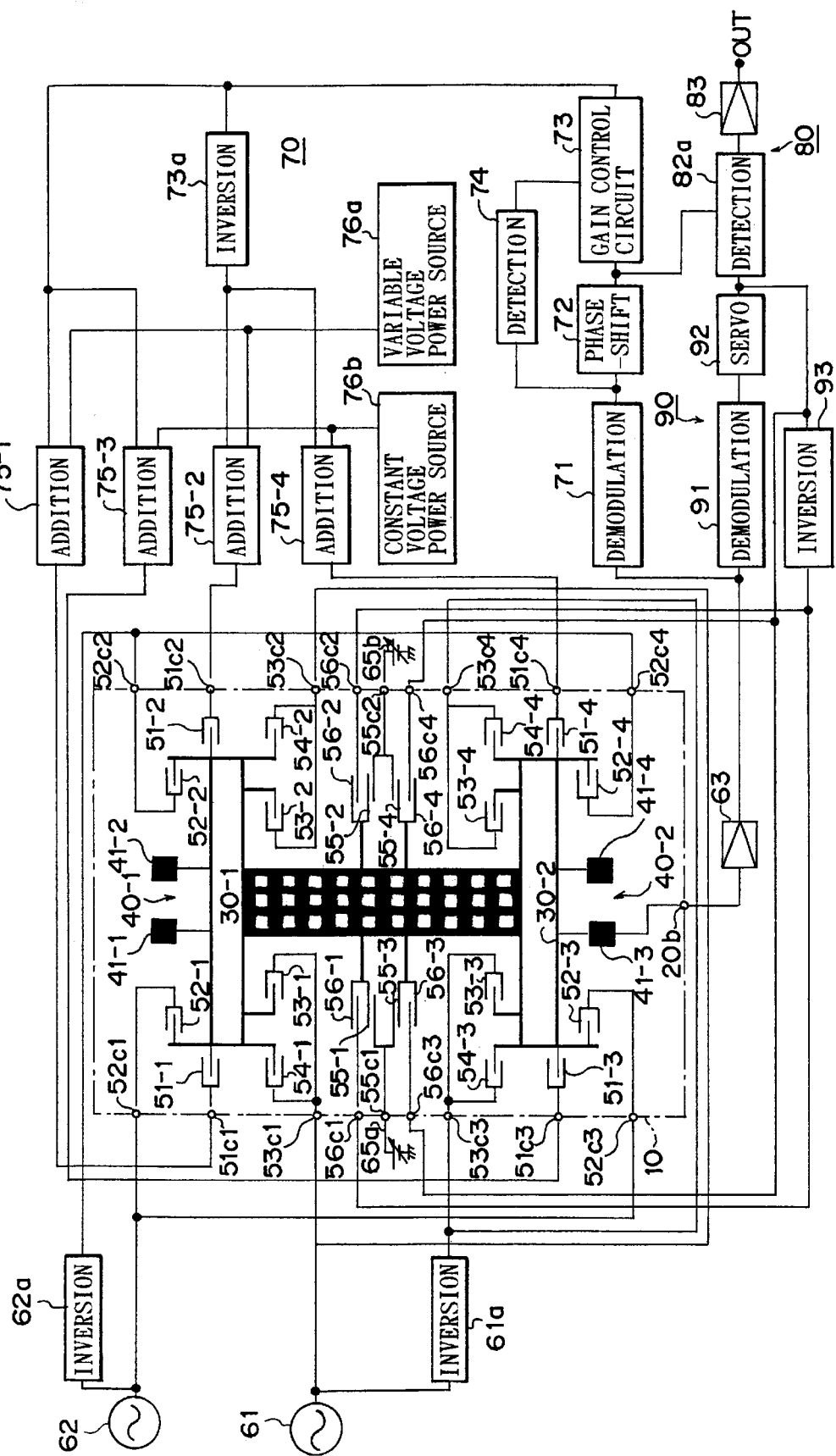
FIG. 9 is a block diagram of a first electric circuit device for detecting angular rate using the angular rate detecting element according to the third embodiment of the present invention.

Next, a first electric circuit device connected to the angular rate detecting element according to the third embodiment will be described. FIG. 9 is a block diagram of the electric circuit device. In this electric circuit device, the aforementioned high frequency generator 61 is connected to the electrode pad 53c1 that is designed commonly for the detection electrode portion 53-1 and the correction electrode portion 54-1 and the electrode pad 53c2 that is designed commonly for the detection electrode portion 53-2 and the correction electrode portion 54-2. The aforementioned phase inversion circuit 61a is connected to the electrode pad 53c3 that is designed commonly for the detection electrode portion 53-3 and the correction electrode portion 54-3 and the electrode pad 53c4 that is designed commonly for the detection electrode portion 53-4 and the correction electrode portion 54-4.

A DC variable voltage power source 65a is connected to the electrode pad 55c1 that is designed commonly for the adjustment electrode portions 55-1 and 55-3. A DC variable voltage power source 65b is connected to the electrode pad 55c2 that is designed commonly for the adjustment electrode portions 55-2 and 55-4. Although these DC variable voltage power sources 65a and 65b may be composed of a plurality of power sources, it is also possible to use a single power source commonly.

A servo control circuit 90 is connected to the electrode pads 56c1 through 56c4 of the servo electrode portions 56-1 through 56-4. The servo control circuit 90, which serves to inhibit the oscillator 20 from oscillating in the direction of the Y-axis, is composed of a demodulation circuit 91, a servo amplifier 92 and a phase inversion circuit 93. The demodulation circuit 91 is the same as the demodulation circuit 81 of the second embodiment. That is, the demodulation circuit 91 retrieves a signal indicative of oscillation of the oscillator 20 in the direction of the Y-axis and outputs the signal as an AC servo control signal. The servo amplifier 92 amplifies the AC servo control signal with a predetermined gain, and supplies the gain-controlled AC servo control signal to the electrode pads 56c3 and 56c4 of the servo electrode pads 56-3 and 56-4, so as to counterbalance oscillation of the oscillator 20 in the direction of the Y-axis (oscillation of the oscillator 20 resulting from an angular rate around the Z-axis). The phase inversion circuit 93 inverts the phase of the gain-controlled AC servo control signal, and supplies the electrode pads 56c1 and 56c2 of the servo electrode portions 56-1 and 56-2 with a control signal with the inverted phase.

The output circuit 80 is connected to a detection circuit 82a and the aforementioned DC amplifier 83. An AC servo control signal is inputted to the detection circuit 82a from the servo amplifier 92. Also, a signal indicative of oscillation of the oscillator 20 in the direction of the X-axis due to the driving thereof is inputted to the detection circuit 82a from the phase-shift circuit 72. Then the detection circuit 82a synchronously detects the AC servo control signal with the signal indicative of oscillation in the direction of the X-axis, and outputs a DC signal indicative of the amplitude of oscillation of the oscillator 20 in the direction of the Y-axis, namely, the magnitude of oscillation of the oscillator 20 in the direction of the Y-axis caused by the angular rate around the Z-axis. The output signal from the phase-shift circuit 72 is utilized because the signal is in synchronization with the phase of a Coriolis force resulting from the angular rate around the Z-axis and in synchronization with the AC servo control signal, namely, with the angular rate of the oscillator 20 around the Z-axis. All the other circuits of the third embodiment are identical to those of the first electric circuit device of the second embodiment. Therefore, these circuits will be marked with the same reference numerals as in the second embodiment and will not be described in any further details.

In the thus-constructed angular rate detecting device according to the third embodiment, if the voltages of the DC variable voltage power source 65a, 65b are changed, the electrostatic forces caused by the adjustment electrode portions 55-1 through 55-4 change, and the displacement amount of the oscillator 20 in response to the force in the direction of the Y-axis is changed. That is, the spring constants of the detection beams 33-1 through 33-4 are changed. Consequently, the resonance frequency of the oscillator 20 in the direction of the Y-axis is adjusted suitably.

Further, the servo control circuit 90 supplies the servo electrode portions 56-1 through 56-4 with AC servo control signals. Therefore, the servo electrode portions 56-1 through 56-4 restrain oscillation of the oscillator 20 in the direction of the Y-axis, that is, oscillation of the oscillator 20 in the direction of the Y-axis resulting from the angular rate around the Z-axis. Ideally, the amplitude of oscillation of the oscillator 20 in the direction of the Y-axis is controlled to "0". At this moment, the servo amplifier 92 outputs a signal for counterbalancing oscillation of the oscillator 20 in the direction of the Y-axis, namely, a signal indicating with an amplitude the magnitude of oscillation of the oscillator 20 in the direction of the Y-axis. Hence, the detection circuit 82a forms a DC signal indicative of the magnitude of the angular rate and outputs the signal through the amplifier 83. Accordingly, although the oscillator 20 does not actually oscillate in the direction of the Y-axis, the signal indicative of the magnitude of the angular rate around the Z-axis is retrieved.

As a result, the third embodiment prevents oscillation of the oscillator 20 in the direction of the Y-axis resulting from an angular rate around the Z-axis from being inputted again to the oscillator 20 through the substrate 10. Thus, it is possible to prevent generation of noise associated with the re-input of oscillation and to thereby enhance the precision in detecting angular rate.

Figure 10:
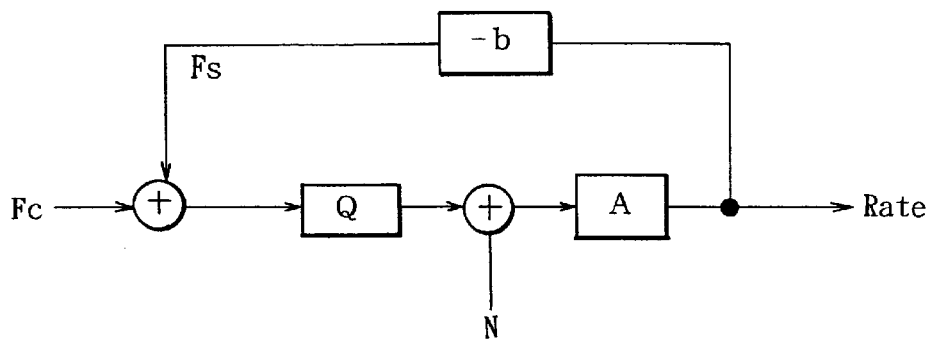
FIG. 10 is a block diagram illustrating the principle of servo control performed in the third embodiment.

Such servo control will be described briefly with reference to FIG. 10, which is a block diagram for illustrating the principle of servo control. Referring to FIG. 10, Fc represents a Coriolis force applied to the oscillator 20 in the direction of the Y-axis through an angular rate around the Z-axis, Fs represents a servo force, Rate represents the angular rate, and N represents an amount of electric noise at the input portion of the electric circuit. Q represents an amount of quality factor of the oscillator 20, A represents a gain of the servo amplifier 92, and b represents an amount of feedback. As can be seen from this block diagram, the angular rate is expressed by a formula (3) shown below.

$$\text{Rate}=(N/Q+Fc)/(1/Q\times A+b) \tag{3}$$

If the gain A can be set to a large value (e.g. a value large enough to be regarded substantially as an infinite), the aforementioned formula (3) is transformed into a formula (4) shown below.

$$\text{Rate}=Fc/b+N/Q\times b \tag{4}$$

In this formula (4), the first term Fc/b represents a detection sensitivity of angular rate and the second term N/Qb represents a noise component. If it is assumed that there is an angular rate detecting device that does not perform the servo control as mentioned above (that lacks the feedback loop shown in FIG. 10), the angular rate Rate is expressed by a formula (5) shown below.

$$Rate = Fc \times Q \times A + N \times A \tag{5}$$

Also in this formula (5), the first term Fc×Q×A represents a detection sensitivity of angular rate and the second term N×A represents a noise component. Comparison of the formulas (4) and (5) reveals that the detection sensitivity of angular rate depends on the resonance Q of the oscillator 20 if the servo control is not performed, and that the detection sensitivity of angular rate does not depend on the resonance Q of the oscillator 20 if the servo control is performed with the gain A set to a relatively large value. Therefore, according to the third embodiment that is designed to servo-control oscillation of the oscillator 20 in the direction of the Y-axis, the detection sensitivity of angular rate does not depend on the resonance Q of the oscillator 20. Consequently, it is possible to stabilize the detection precision.

Figure 11A:
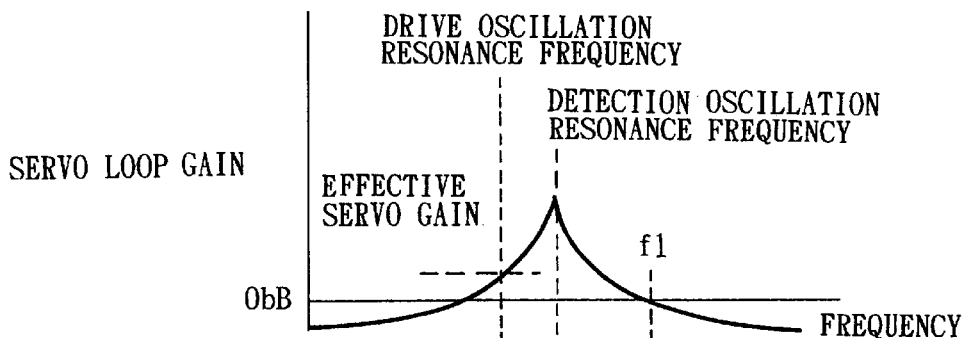
FIG. 11A is a graph showing the frequency characteristic of a servo loop gain in the servo control.
Figure 11B:
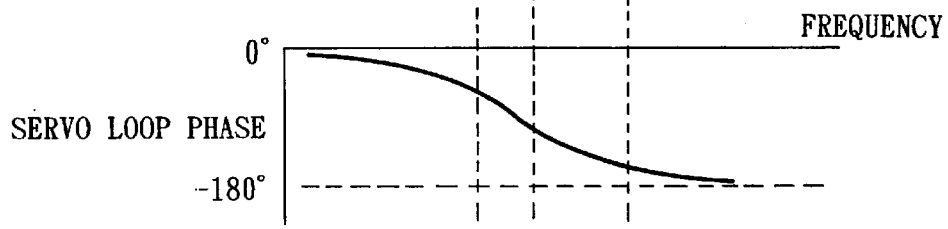
FIG. 11B is a graph showing the frequency characteristic of a servo loop phase in the servo control.

Next, a second electric circuit device connected to the angular rate detecting element of the third embodiment will be described. Prior to the description of the second electric circuit device, the problem to be solved in the angular rate detecting device employing the first electric circuit device will be described. This kind of servo control needs to be performed in the vicinity of the resonance frequency of the oscillator 20 (ranging from several KHz to several tens of KHz). On the other hand, as shown in FIG. 11B, this type of angular rate detecting element causes a great phase deviation along the axis of frequency owing to a mechanical phase delay. If the gain of the servo loop is set too large, the phase deviation causes oscillation resulting from the servo control in a frequency range with a great phase deviation. For this reason, it is necessary to realize stable servo control with a relatively small gain of the servo loop as can be seen from FIG. 11A. This means that it is indispensable to keep the gain A in the formula (3) at a relatively low value. As a result, the detection sensitivity of angular rate as explained with reference to the formula (4) depends on the resonance Q. so that it becomes impossible to stabilize the detection sensitivity sufficiently.

Figure 12:
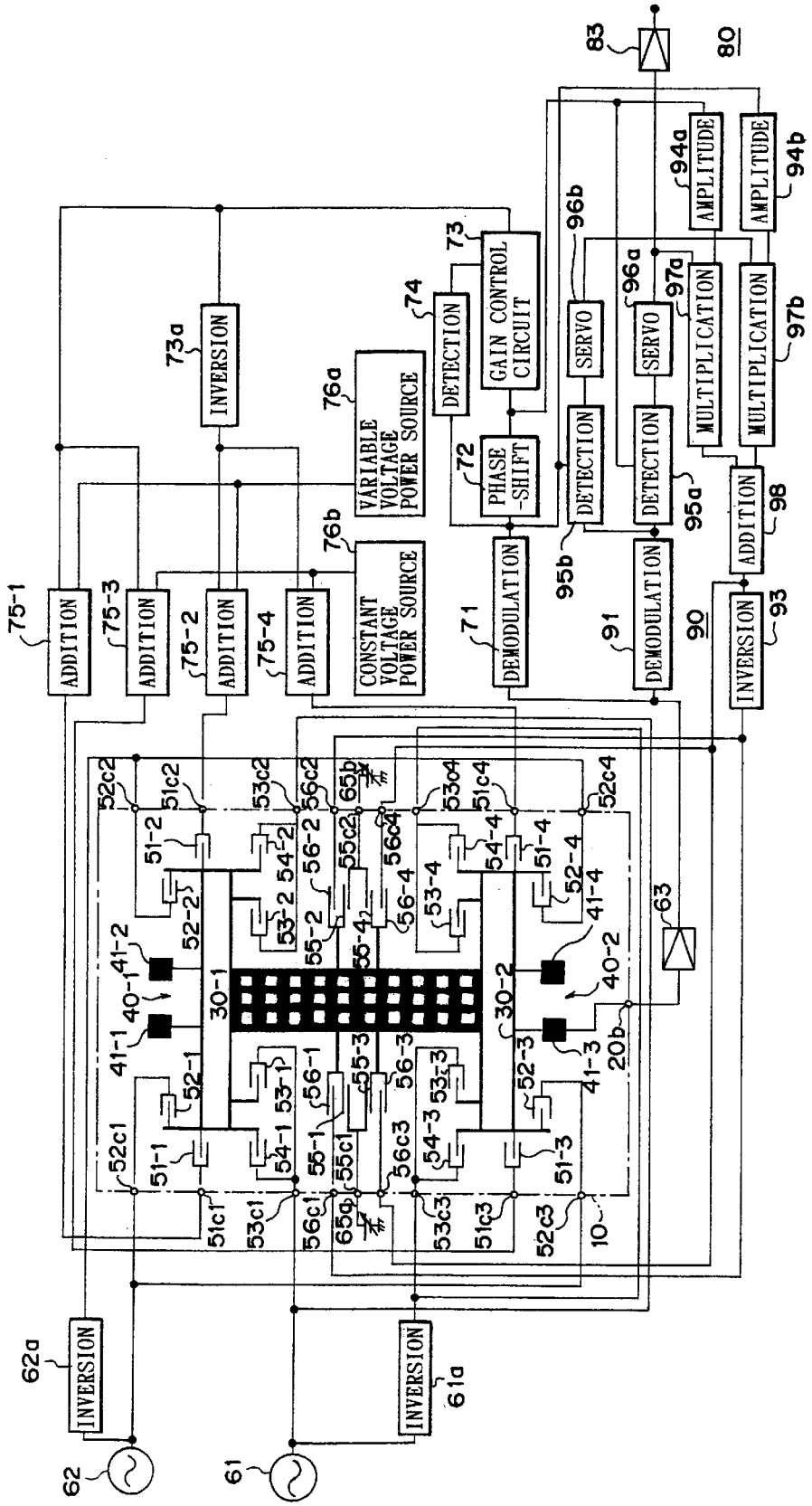
FIG. 12 is a block diagram of a second electric circuit device for detecting angular rate using the angular rate detecting element according to the third embodiment of the present invention.

The second electric circuit device has been devised with a view to solving such a problem. The second electric circuit device will now be described with reference to a block diagram shown in FIG. 12. The second electric circuit device is different from the first electric circuit device merely in construction of the output circuit 80 and the servo control circuit 90. Therefore, the following description will be focused on the output circuit 80 and the servo control circuit 90 exclusively.

The servo control circuit 90 is composed of a first servo control circuit and a second servo control circuit. The first servo control circuit is composed of an amplitude control circuit 94a, a detection circuit 95a, a servo amplifier 96a and a multiplication circuit 97a, and inhibits the oscillator 20 from oscillating in the direction of the Y-axis in accordance with the angular rate. The second servo control circuit is composed of an amplitude control circuit 94b, a detection circuit 95b, a servo amplifier 96b and a multiplication circuit 97b, and inhibit the oscillator 20 from causing cross talk in the direction of the Y-axis due to the driving thereof.

The amplitude control circuit 94a controls the amplitude of a signal, which is outputted from the phase shift circuit 72 and is synchronous with a Coriolis force applied to the oscillator 20, to a predetermined reference value. Thereby the amplitude control circuit 94a forms a first reference signal with a constant amplitude, which signal is synchronous with oscillation of the oscillator 20 in the direction of the Y-axis caused by the angular rate. The detection circuit 95a synchronously detects a signal, which is outputted from the demodulation circuit 91 and indicative of oscillation of the oscillator 20 in the direction of the Y-axis, with a signal which is outputted from the phase shift circuit 72 and synchronous with a Coriolis force applied to the oscillator 20 (the signal synchronous with oscillation of the oscillator 20 in the direction of the Y-axis caused by the angular rate). The detection circuit 95a then forms a first DC servo control signal that is in proportion to the oscillation of the oscillator 20 in the direction of the Y-axis caused by the angular rate. The servo amplifier 96a DC-amplifies the first DC servo control signal with a predetermined gain and outputs the thus-amplified signal. The multiplication circuit 97a multiplies the first reference signal by the gain-adjusted first DC servo control signal, thereby controlling the amplitude of the first reference signal in accordance with the gain-adjusted first DC servo control signal. Then the multiplication circuit 97a outputs the first reference signal with a controlled amplitude as a control signal for inhibiting the oscillator 20 from oscillating in the direction of the Y-axis due to the angular rate.

The amplitude control circuit 94b controls the amplitude of a signal, which is outputted from the demodulation circuit 71 and is synchronous with the cross talk of the oscillator 20 caused by the driving thereof (a signal whose phase is retarded by 90° from the oscillation of the oscillator 20 in the direction of the Y-axis caused by the angular rate) to a predetermined reference value. Thereby the amplitude control circuit 94b forms a second reference signal with a constant amplitude, which signal is synchronous with the cross talk of the oscillator 20 in the direction of the Y-axis caused by the driving thereof. The detection circuit 95b synchronously detects a signal, which is outputted from the demodulation circuit 91 and indicative of oscillation of the oscillator 20 in the direction of the Y-axis, with a signal which is outputted from the demodulation circuit 71 and synchronous with the oscillation of the oscillator 20 in the direction of the Y-axis caused by the driving thereof. The detection circuit 95b then forms a second DC servo control signal that is in proportion to the cross talk of the oscillator 20 in the direction of the Y-axis caused by the driving thereof The servo amplifier 96b DC-amplifies the second DC servo control signal with a predetermined gain and outputs the thus-amplified signal. The multiplication circuit 97b multiplies the second reference signal by the gain-adjusted second DC servo control signal, thereby controlling the amplitude of the second reference signal in accordance with the gain-adjusted second DC servo control signal. Then the multiplication circuit 97b outputs the second reference signal with a controlled amplitude as a control signal for inhibiting the oscillator 20 from causing cross talk in the direction of the Y-axis due to the driving thereof.

Outputs of the multiplication circuits 97a and 97b are connected to an adding circuit 98. The adding circuit 98 adds and synthesizes respective outputs from the multiplication circuits 97a and 97b and supplies them to the electrode pads 56c3 and 56c4 of the servo electrode portions 56-3 and 56-4. As is the case with the first electric circuit device of the third embodiment, the phase inversion circuit 93 inverts the phase of the synthetic signal obtained from the adding circuit 98, and supplies the electrode pads 56c1 and 56c2 of the servo electrode portions 56-1 and 56-2 with the synthetic signal with the inverted phase.

Further, the output circuit 80 is provided with the amplifier 83 which is the same as that used in the first electric circuit device. The amplifier 83 DC-amplifies an output signal from the servo amplifier 96a and outputs the signal.

In the thus-constructed second electric circuit device, the first servo control circuit inhibits the oscillator 20 from oscillating in the direction of the Y-axis in accordance with the angular rate. Therefore, it is possible to prevent noise from being generated when the oscillation of the oscillator 20 in the direction of the Y-axis caused by the angular rate is reversely inputted to the oscillator 20 through the substrate 10.

Further, the second servo control circuit inhibits the oscillator 20 from causing cross talk in the direction of the Y-axis due to the driving thereof. Thus, it is also possible to prevent cross talk of the oscillator 20 in the direction of the Y-axis caused by the driving thereof. On the other hand, the servo amplifier 96a outputs a DC signal proportional to the amplitude of the oscillation of the oscillator 20 in the direction of the Y-axis caused by an angular rate. Consequently, a DC signal indicative of the angular rate is obtained from the amplifier 83.

In the second electric circuit device, the detection circuits 95a and 95b are provided forwardly of the servo amplifiers 96a and 96b respectively. Therefore, there is no need to perform servo control in the range of the resonance frequency of the sensor. As a result, the aforementioned problem of phase deviation is solved, and the gain of the aforementioned servo loop can be set large. This means that the gain A in the formula (3) can be substantially set to an infinite. Consequently, the detection sensitivity of angular rate as explained with reference to the formula (4) does not depend on the resonance Q, so that the detection sensitivity of angular rate can be stabilized. Further, even if there is a phase deviation generated in detection signals because of the amplifier 63 and the demodulation circuit 91, it is only the gain of the servo control that changes. In other words, the detection sensitivity of angular rate, offset or the like is not affected at all.

It will now be described how to judge the presence of abnormality according to the third embodiment.

In the third embodiment, the servo control is performed to inhibit the oscillator 20 from oscillating in the direction of the Y-axis. Therefore, the signal which passes through the servo control circuit 90 and is indicative of oscillation of the oscillator 20 in the direction of the Y-axis is at a significantly low level. Accordingly, it may not be easy to determine whether the signal indicative of oscillation of the oscillator 20 in the direction of the Y-axis is almost at "0" because there is an abnormality such as disconnection of lines in the servo control circuit 90 or because the oscillator 20 is inhibited from oscillating in the direction of the Y-axis. Thus, the presence of such abnormality may not be judged on time. The disconnection of the lines tend to occur in the case where terminals such as circuit components (e.g. capacitors and resistors) constituting low-pass filters that are provided in the output portion of the detection circuit 82a, the amplifier 83, the output portions of the servo amplifiers 96a and 96b or high pass filters that are provided in the amplifier 63 and the demodulation circuit 91 are opened.

Figure 13:
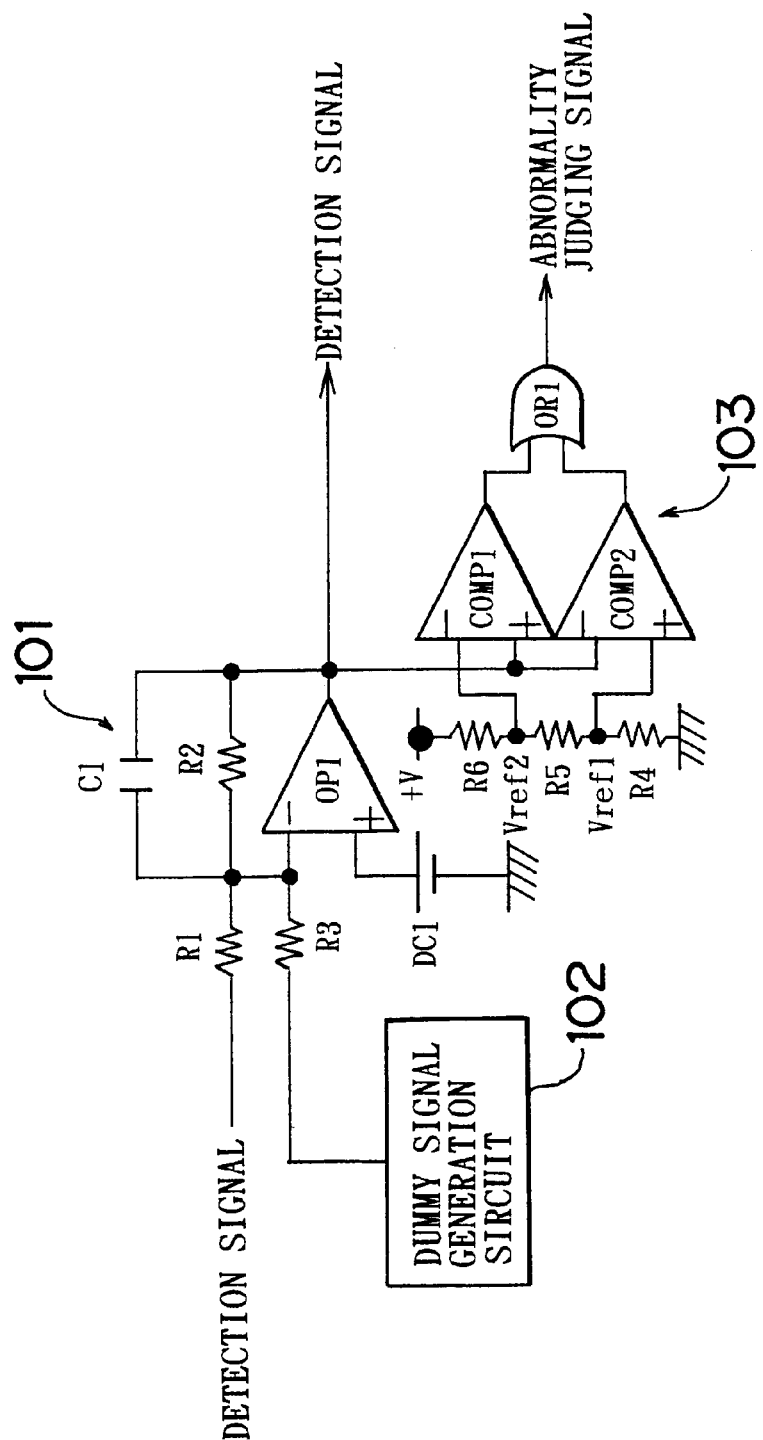
FIG. 13 is a block diagram of a first abnormality judging circuit device suited to be incorporated in a servo control circuit of the third embodiment.

The device for judging the presence of abnormality will now be described. FIG. 13 is a block diagram showing an example of a first abnormality judging device. In this example of the first abnormality judging device, a low-pass filter 101 is provided in the path of a detection signal indicative of oscillation of the oscillator 20 in the direction of the Y-axis. The low-pass filter 101 is composed of an operational amplifier OP1, resistors R1 and R2, a capacitor C1 and a DC power source DC1. Through a resistor R3, a dummy signal generation circuit 102 is connected upstream of the signal path, that is, on the input side of the low-pass filter 101. As an output signal, the dummy signal generation circuit 102 outputs a signal with a frequency that is higher than the cut-off frequency of the low-pass filter 101, not used for the detection signal and not included in the detection signal. The dummy signal generation circuit 102 then superposes the dummy signal onto the detection signal through the resistor R3.

A window comparator 103 is connected downstream of the path of the detection signal, that is, to the output of the low-pass filter 101. The window comparator 103 is composed of comparators COMP1 and COMP2, resistors R4, R5 and R6 and an OR circuit OR1, and constitutes an abnormality judging circuit. In this case, the detection signal is set to a level between first and second reference voltages Vref1 and Vref2, which are determined by the resistors R4, R5 and R6. The dummy signal is set to such a great amplitude as to exceed the levels of the first and second reference voltages Vref1 and Vref2.

The operation of the first abnormality judging circuit will now be described. If there is no abnormality such as disconnection of lines in the circuit components such as the capacitor C1 and the low-pass filter 101 operates normally, the dummy signal generated by the dummy signal generation circuit 102 does not pass through the low-pass filter 101. Hence, the window comparator 103 outputs a low-level signal indicative of a normal state from the OR circuit OR1, instead of responding to the detection signal. On the other hand, if there is an abnormality such as disconnection of lines in the circuit components such as the capacitor C1 and the low-pass filter 101 fails to operate normally, the dummy signal passes through the low-pass filter 101. In this case, the window comparator 103 responds to the dummy signal and outputs a high-level signal indicative of an abnormal state from the OR circuit OR1. Thus, the window comparator 103 is capable of detecting the presence of abnormality in the signal path including the low-pass filter 101 with no delay, based on whether or not the dummy signal has passed therethrough. A fail-processing circuit (not shown), which is connected to the window comparator 103, can cope with the abnormality in the signal path with no delay.

Figure 14:
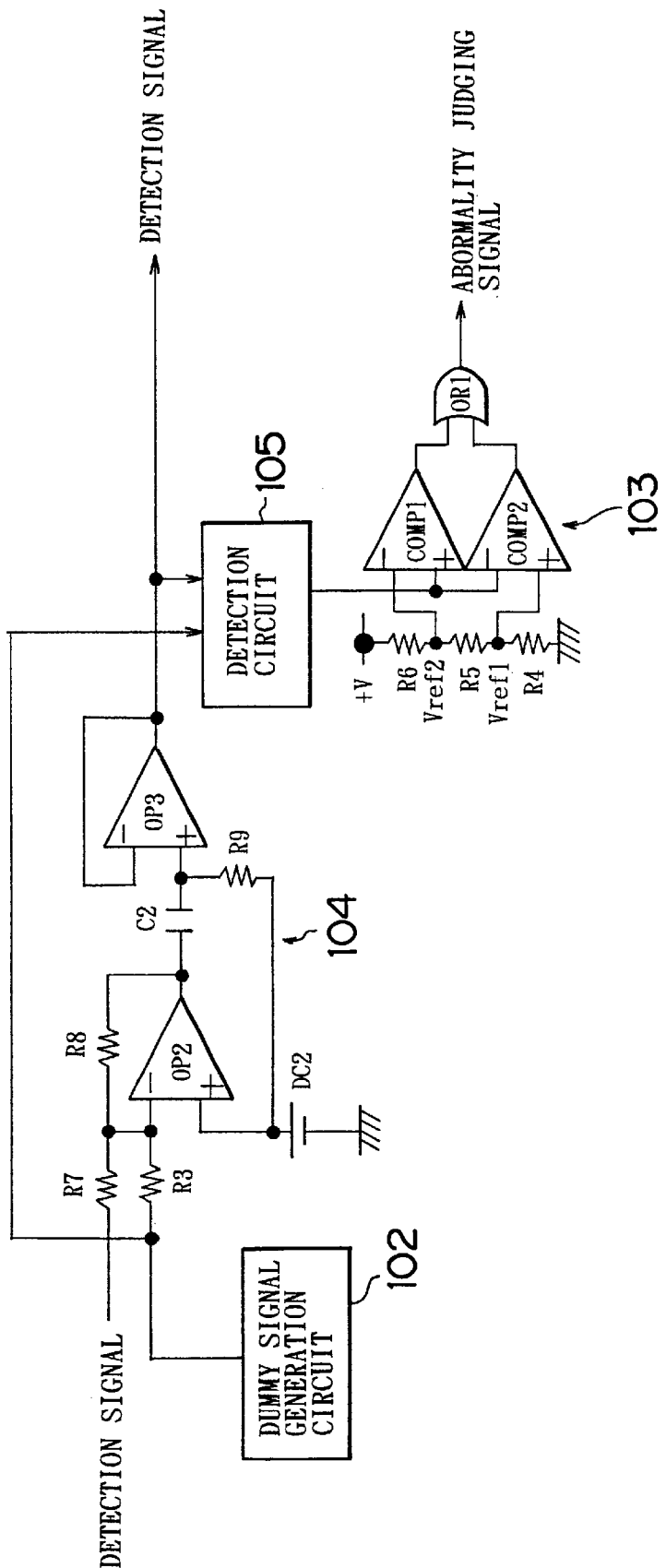
FIG. 14 is a block diagram of a second abnormality determining circuit device suited to be incorporated in the servo control circuit of the third embodiment.

FIG. 14 is a block diagram showing an example of a second abnormality judging device. In this example of the second abnormality judging device, a high-pass filter 104 is provided in the path of a detection signal indicative of oscillation of the oscillator 20 in the direction of the Y-axis. The high-pass filter 104 is composed of operational amplifiers OP2 and OP3, resistors R7, R8 and R9, the capacitor C2 and the DC power source DC2. Through the resistor R3, the dummy signal generation circuit 102 is connected upstream of the signal path, that is, on the input side of the high-pass filter 104, as is the case with the example of the first abnormality judging device. As an output signal, the dummy signal generation circuit 102 outputs a signal with a frequency that is higher than the cut-off frequency of the high-pass filter 104, not used for the detection signal and not included in the detection signal. The dummy signal generation circuit 102 then superposes the dummy signal onto the detection signal through the resistor R3.

A detection circuit 105 and the window comparator 103, which is the same as in the example of the first abnormality judging device, are connected downstream of the path of the detection signal, that is, to the output of the high-pass filter 104. The detection circuit 105 and the window comparator 103 constitute an abnormality judging circuit. The dummy signal is supplied to the detection circuit 105. The detection circuit 105 synchronously detects an output from the high-pass filter 104 with the dummy signal, converts the dummy signal into a DC signal indicative of the amplitude thereof, and outputs the DC signal to the window comparator 103. In this case, the amplitude of the dummy signal is set to a range between the first and second reference voltages Vref1 and Vref2, which are determined by the resistors R4, R5 and R6.

The operation of the second abnormality judging circuit will now be described. If there is no abnormality such as disconnection of lines in the circuit components such as the capacitor C2 and the high-pass filter 104 operates normally, the dummy signal generated by the dummy signal generation circuit 102 passes through the high-pass filter 104. The detection circuit 105 then synchronously detects the dummy signal and outputs a DC voltage signal. Therefore, the window comparator 103 outputs a low-level signal indicative of a normal state, instead of responding to the DC voltage signal. On the other hand, if there is an abnormality such as disconnection of lines in the circuit components such as the capacitor C2, the dummy signal does not pass through the high-pass filter 104. The window comparator 103 then responds to a "0"-level signal outputted from the detection circuit 105, and outputs a high-level signal indicative of an abnormal state from the OR circuit OR1. Thus, the window comparator 103 is capable of detecting the presence of abnormality in the signal path including the high-pass filter 104 with no delay, based on whether or not the dummy signal has passed therethrough. A fail-processing circuit (not shown), which is connected to the window comparator 103, can cope with the abnormality in the signal path with no delay.

Figure 15:
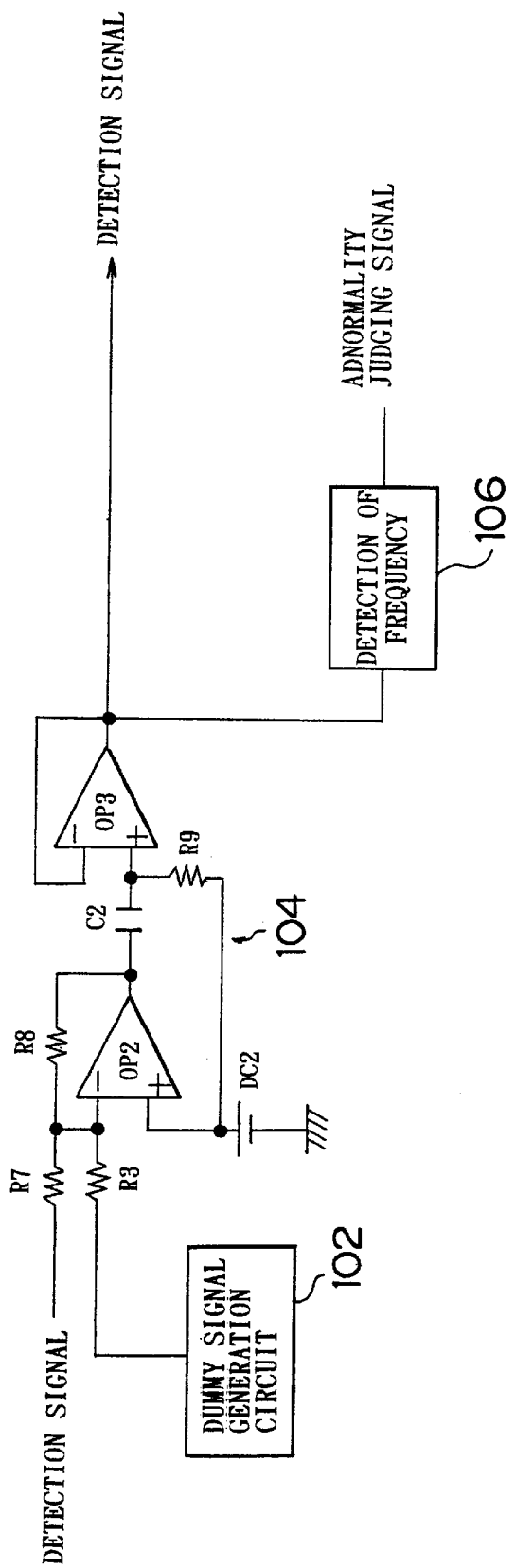
FIG. 15 is a block diagram of a third abnormality determining circuit device suited to be incorporated in the servo control circuit of the third embodiment.

FIG. 15 is a block diagram showing an example of a third abnormality judging device. In this example of the third abnormality judging device, a frequency detection circuit 106 is employed in place of the detection circuit 105 and the window comparator 103 that are used in the second abnormality judging device. The frequency detection circuit 106 detects the frequency of a dummy signal and thereby outputs a high-level signal upon arrival of the dummy signal. Unless the arrival of the dummy signal is confirmed, the frequency detection circuit 106 outputs a low-level signal. Also in this case, the dummy signal has a frequency that is higher than the cut-off frequency of the high-pass filter 104, not used for the detection signal and not included in the detection signal.

Also in the thus-constructed third abnormality judging device, if there is no abnormality such as disconnection of lines in the circuit components such as the capacitor C2 and the high-pass filter 104 operates normally, the dummy signal generated by the dummy signal generation circuit 102 passes through the high-pass filter 104. The frequency detection circuit 106 then responds to the arrival of the dummy signal and outputs a high-level signal indicative of a normal state. On the other hand, if there is an abnormality such as disconnection of lines in the circuit components such as the capacitor C2, the dummy signal does not pass through the high-pass filter 104. The frequency detection circuit 106 then outputs a low-level signal indicative of an abnormal state. Thus, the frequency detection circuit 106 is capable of detecting the presence of abnormality in the signal path including the high-pass filter 104 with no delay, based on whether or not the dummy signal has passed therethrough. A fail-processing circuit (not shown), which is connected to the frequency detection circuit 106, can cope with the abnormality in the signal path with no delay.

Accordingly, if the aforementioned first through third abnormality judging devices are employed, the servo control is performed to inhibit the oscillator 20 from oscillating in the direction of the Y-axis. Besides, even if the amplitude of the signal indicative of the oscillation of the oscillator 20 in the direction of the Y-axis is equal to "0" or significantly small, it is possible to detect an abnormality resulting from disconnection of the signal path with no delay, based on whether or not the dummy signal is present.

Next, some modifications of the aforementioned embodiments will be described.

In the first through third embodiments, in order to cause the oscillator 20 to oscillate in the direction of the X-axis through the main frames 30-1 and 30-2, a pair of drive electrode portions 51-1 and 51-2 that are disposed on a line extending in the direction of the X-axis and a pair of drive electrode portions 51-3 and 51-4 that are disposed on a line extending in the direction of the X-axis are located differently in the direction of the Y-axis. However, another pair or a plurality of pairs of drive electrode portions that are disposed on a line extending in the direction of the X-axis may further be located differently from the drive electrode portions 51-1 through 51-4 in the direction of the Y-axis. Also in this case, all the pairs of the drive electrode portions are supplied with drive signals with reverse phases, and the driving force resulting from a drive signal supplied to at least one pair of the drive electrode portions can be changed.

Furthermore, in the first through third embodiments, the variable voltage power source circuit 76a is connected to the adders 75-1 and 75-2, and the constant voltage power source circuit 76b is connected to the adders 75-3 and 75-4. However, the variable voltage power source circuit 76a and the constant voltage power source circuit 76b have only to adjust a mutual relationship between the voltage applied to the drive electrode portions 51-1 and 51-2 and the voltage applied to the drive electrode portions 51-3 and 51-4. Hence, the constant voltage power source circuit may be connected to the adders 75-1 and 75-2, and the variable voltage power source circuit may be connected to the adders 75-3 and 75-4. Alternatively, both the power source circuits 76a and 76b may be designed as a variable voltage power source circuit.

Furthermore, in the first through third embodiments, the adders 75-1 through 75-4 superpose an AC signal from the gain control circuit 73 and the phase inversion circuit 73a onto a DC signal so as to generate a drive signal supplied to the drive electrode portions 51-1 through 51-4. However, the AC signal from the gain control circuit 73 and the phase inversion circuit 73a may be used as a drive signal supplied to the drive electrode portions 51-1 through 51-4. In this case, in order to make it possible to change a mutual relationship between the driving force generated by the drive electrode portions 51-1 and 51-2 and the driving force generated by the drive electrode portions 51-3 and 51-4, at least one of the amplitude of the drive signal formed of the AC signal supplied to the drive electrode portions 51-1 and 51-2 and the amplitude of the drive signal formed of the AC signal supplied to the drive electrode portions 51-3 and 51-4 may be variable.

While the present invention has been described with reference to what are presently considered to be preferred embodiments thereof, it is to be understood that the present invention is not limited to the disclosed embodiments or construction. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. An angular rate detecting device comprising:
an oscillation portion connected to a substrate via a supporting member and oscillatable over the substrate in directions of an X-axis and a Y-axis, the X and Y axes being perpendicular to one another;
a drive portion causing the oscillation portion to oscillate independently along the X-axis, the drive portion comprising a plurality of sectional drive portions spaced apart in the direction of the Y-axis, the sectional drive portions being capable of oscillating the oscillating portion independently in the direction of the X-axis;
a detection portion detecting oscillation of the oscillation portion with respect to the substrate in the direction of the Y-axis; and
an angular rate detector for detecting, based on oscillation of the oscillation portion in the direction of the Y-axis, an angular rate that is effective around a Z-axis, the Z axis being perpendicular to both the X-axis and the Y-axis, with the oscillation portion oscillating in the direction of the X-axis.

2. The angular rate detecting device according to claim 1, wherein the oscillation portion is composed of a frame and an oscillator connected via a beam, and wherein the sectional drive portions drive the frame with respect to the substrate in the direction of the X-axis and cause the oscillator to oscillate with respect to the substrate in the direction of the X-axis, and wherein the detection portion detects oscillation of the oscillator with respect to the substrate in the direction of the Y-axis.

3. The angular rate detecting device according to claim 2, wherein independent drive signals are supplied to each of the sectional drive portions, and wherein the device further comprises a drive signal generation circuit for varying a driving force resulting from at least one of the drive signals.

4. The angular rate detecting device according to claim 2, wherein each of the sectional drive portions is composed of a pair of drive electrodes disposed on a line extending in the direction of the X-axis.

5. The angular rate detecting device according to claim 4, further comprising a drive signal generation circuit supplying a respective set of drive signals to each of the sectional drive portions, with each of the sectional drive signals corresponding to the pair of drive electrodes that constitute the sectional drive portions, the drive signal generation circuit setting the respective sets of drive signals opposite in phase and making a driving force resulting from at least one of the sets of drive signals variable.

6. The angular rate detecting device according to claim 1, wherein drive signals are supplied to the sectional drive portions, wherein the drive signals are independent from one another, and wherein the device comprises a drive signal generation circuit for making a driving force resulting from at least one of the drive signals variable.

7. The angular rate detecting device according to claim 1, wherein each of the sectional drive portions is composed of a pair of drive electrodes disposed on a line extending in the direction of the X-axis.

8. The angular rate detecting device according to claim 7, further comprising a drive signal generation circuit for supplying a respective set of drive signals to each of the sectional drive portions with each set of drive signals corresponding to a respective pair of drive electrodes constituting the corresponding sectional drive portion, the drive signal generation circuit setting the respective sets of drive signals opposite in phase and making a driving force resulting from at least one of the sets of drive signals variable.

9. An angular rate detecting device comprising:
a frame connected to a substrate through a driving beam and oscillatable with respect to the substrate in a direction of an X-axis, the frame being divided into a plurality of sections;
an oscillator connected to an inside of the frame via the driving beam and supported oscillatably with respect to the substrate in the direction of the X-axis and in a direction of a Y-axis, the Y-axis being perpendicular to the X-axis;
a drive portion causing the frame to oscillate with respect to the substrate in the direction of the X-axis;
a detection portion detecting oscillation of the oscillator with respect to the substrate in the direction of the Y-axis; and
an angular rate detector for detecting, based on oscillation of the oscillation portion in the direction of the Y-axis, an angular rate effective around a Z-axis, the Z-axis being perpendicular to both the X-axis and the Y-axis, wherein the flame and the oscillator oscillates in the direction of the X-axis.

10. The angular rate detecting device according to claim 9, wherein the frame comprises a main frame having a portion extending in the direction of the X-axis, the main frame being connected to the oscillator via the detecting beam and a sub-frame extending parallel to a portion of the main frame extending in the direction of the X-axis, and wherein the driving beam comprises first and second driving beams, the first driving beam connecting the substrate with the sub-frame and supporting the sub-frame oscillatably with respect to the substrate in the direction of the X-axis, the second driving beam connecting the sub-frame with the main frame and supporting the main frame oscillatably with respect to the substrate in the direction of the X-axis.

11. An angular rate detecting device comprising:
a frame connected to a substrate via a driving beam, the frame being oscillatable with respect to the substrate in a direction of an X-axis, the driving beam comprising a pair of drive beams disposed symmetrically with respect to a central position of the frame in the direction of the X-axis and at least another drive beam provided between the pair of the drive beams;
an oscillator connected to an inside of the frame and supported oscillatably with respect to the substrate in the direction of the X-axis and in a direction of a Y-axis, the Y-axis being perpendicular to the X-axis;
a drive portion causing the frame to oscillate with respect to the substrate in the direction of the X-axis;
a detection portion detecting oscillation of the oscillator with respect to the substrate in the direction of the Y-axis; and
an angular rate detector detecting, based on oscillation of the oscillation portion in the direction of the Y-axis, an angular rate effective around a Z-axis, the Z-axis being perpendicular to both the X-axis and the Y-axis, wherein the flame and the oscillator oscillates in the direction of the X-axis.

12. The angular rate detecting device according to claim 11, wherein the frame comprises a main frame and a sub-frame, the main frame having a portion extending in the direction of the X-axis and being connected to the oscillator through the detecting beam, and wherein the sub-frame extends parallel to the portion of the main frame extending in the direction of the X-axis, and wherein the driving beam comprises first and second driving beams, the first driving beam connecting the substrate to the sub-frame and supporting the sub-frame oscillatably with respect to the substrate in the direction of the X-axis, the second driving beam connecting the sub-frame to the main frame and supporting the main frame oscillatably with respect to the substrate in the direction of the X-axis.

13. An angular rate detecting device comprising:
a frame connected to a substrate via a driving beam and oscillatable with respect to the substrate in a direction of an X-axis;
an oscillator connected to the frame via the driving beam and supported oscillatably with respect to the substrate;
a drive portion causing the frame to oscillate with respect to the substrate in the direction of the X-axis;
a detection portion detecting oscillation of the oscillator with respect to the substrate in a direction of a Y-axis, the Y-axis being perpendicular to the X-axis;
an angular rate detector detecting, based on oscillation of the oscillator in the direction of the Y-axis, an angular rate effective around a Z-axis, the Z-axis being perpendicular to both the X-axis and the Y-axis, wherein the flame and the oscillator oscillates in the direction of the X-axis; and
a correction portion retrieving an oscillation component of the frame with respect to the substrate in the direction of the Y-axis.

14. The angular rate detecting device according to claim 13, wherein the driving beam supports the frame so that the frame oscillates with respect to the substrate more easily in the direction of the X-axis than in the direction of the Y-axis, and wherein a detecting beam is connected to the frame so that the oscillator oscillates with respect to the substrate more easily in the direction of the Y-axis than in the direction of the X-axis.

15. The angular rate detecting device according to claim 14, wherein the detection portion is electrically connected to the correction portion, and wherein the oscillation component of the frame in the direction of the Y-axis retrieved by the correction portion is removed from the oscillation component of the oscillator in the direction of the Y-axis detected by the detection portion.

16. The angular rate detecting device according to claim 14, further comprising an arithmetic circuit removing the oscillation component of the frame in the direction of the Y-axis retrieved by the correction portion from the oscillation component of the oscillator in the direction of the Y-axis detected by the detection portion.

17. The angular rate detecting device according to claim 13, wherein the detection portion is electrically connected to the correction portion, and the oscillation component of the frame in the direction of the Y-axis retrieved by the correction portion is removed from the oscillation component of the oscillator in the direction of the Y-axis detected by the detection portion.

18. The angular rate detecting device according to claim 13, further comprising an arithmetic circuit for removing the oscillation component of the frame in the direction of the Y-axis retrieved by the correction portion from the oscillation component of the oscillator in the direction of the Y-axis detected by the detection portion.

19. An angular rate detecting device comprising:
an oscillation portion connected to a substrate via a supporting member, the oscillation portion being oscillatable over the substrate in directions of an X-axis and a Y-axis, the X-axis and the Y-axis being perpendicular to one another;
a drive portion causing the oscillation portion to oscillate with respect to the substrate in the direction of the X-axis;
a detection portion detecting oscillation of the oscillation portion with respect to the substrate in the direction of the Y-axis;
an angular rate detector detecting, based on oscillation of the oscillation portion in the direction of the Y-axis, an angular rate effective around a Z-axis, the Z-axis being perpendicular to both the X-axis and the Y-axis, wherein the oscillation portion oscillates in the direction of the X-axis;
a servo portion restraining oscillation of the oscillation portion in the direction of the Y-axis;
a drive circuit causing the oscillation portion to oscillate with respect to the substrate in the direction of the X-axis with a predetermined amplitude, in cooperation with the drive portion;
a retrieval circuit retrieving a signal indicative of oscillation of the oscillation portion with respect to the substrate in the direction of the Y-axis, in cooperation with the detection portion;
a servo control circuit forming a servo control signal, based on the retrieved signal indicative of oscillation of the oscillation portion in the direction of the Y-axis, the servo control signal being supplied to the servo portion to restrain oscillation of the oscillation portion in the direction of the Y-axis; and
an output circuit outputting a signal corresponding to the formed servo control signal as a signal indicative of the angular rate.

20. The angular rate detecting device according to claim 19, wherein the servo control circuit comprises a servo signal supplying circuit for receiving the retrieved signal indicative of oscillation of the oscillation portion in the direction of the Y-axis and supplying the servo portion with the servo control signal, wherein the servo control signal is an AC signal, and wherein the output circuit comprises a DC-conversion circuit for converting the AC servo control signal into a DC signal proportional to an amplitude of the AC servo control signal.

21. The angular rate detecting device according to claim 20, further comprising an abnormality judging circuit coupled to a downstream side of a path of a signal indicative of oscillation of the oscillation portion in the direction of the Y-axis, the abnormality judging circuit supplying an upstream portion of the path with a dummy signal of a predetermined frequency, superposes the dummy signal onto the signal indicative of oscillation of the oscillation portion in the direction of the Y-axis, and judges whether there is an abnormality in the path, based on whether the dummy signal is received.

22. The angular rate detecting device according to claim 19, wherein the servo control circuit comprises a reference signal forming circuit connected to the drive circuit, the reference signal forming circuit forming a reference signal having a predetermined amplitude and corresponding to a phase of oscillation of the oscillation portion resulting from an angular rate, the servo control circuit further including a DC-conversion circuit and a servo signal supplying circuit, the DC-conversion circuit converting the retrieved signal indicative of oscillation of the oscillation portion in the direction of the Y-axis into the servo control signal proportional to an amplitude value of the retrieved signal, the servo control signal output by the DC-conversion circuit being a DC signal, and wherein the servo signal supplying circuit controls the amplitude of the reference signal in accordance with the DC servo control signal and supplies the servo portion with the amplitude-controlled reference signal to restrain oscillation of the oscillation portion in the direction of the Y-axis, and wherein the output circuit outputs the DC servo control signal as a signal indicative of the angular rate.

23. The angular rate detecting device according to claim 22, further comprising an abnormality judging circuit coupled to a downstream side of a path of a signal indicative of oscillation of the oscillation portion in the direction of the Y-axis, the abnormality judging circuit supplying an upstream portion of the path with a dummy signal of a predetermined frequency, wherein the abnormality judging circuit superposes the dummy signal onto the signal indicative of oscillation of the oscillation portion in the direction of the Y-axis and judges whether or not there is an abnormality in the path based on whether the dummy signal is received.

24. The angular rate detecting device according to claim 19, further comprising an abnormality judging circuit coupled to a downstream side of a path of a signal indicative of oscillation of the oscillation portion in the direction of the Y-axis, the abnormality judging circuit supplying an upstream portion of the path with a dummy signal of a predetermined frequency, wherein the abnormality judging circuit superposes the dummy signal onto the signal indicative of oscillation of the oscillation portion in the direction of the Y-axis and judges whether there is an abnormality in the path based on whether the dummy signal is received.

25. An angular rate detecting device comprising:
an oscillation portion connected to a substrate via a supporting member, the oscillation portion being oscillatable over the substrate along an X-axis and a Y-axis, the X and Y axes being perpendicular to one another;
a drive portion causing the oscillation portion to oscillate with respect to the substrate in the direction of the X-axis;
a detection portion detecting oscillation of the oscillation portion with respect to the substrate in the direction of the Y-axis;
an angular rate detector for detecting, based on oscillation of the oscillation portion in the direction of the Y-axis, an angular rate effective around a Z-axis, the Z-axis being perpendicular to both the X-axis and the Y-axis, wherein the oscillation portion oscillates in the direction of the X-axis;
a servo portion restraining oscillation of the oscillation portion in the direction of the Y-axis;
a drive circuit causing the oscillation portion to oscillate with respect to the substrate in the direction of the X-axis with a predetermined amplitude, in cooperation with the drive portion;
a retrieval circuit retrieving a signal indicative of oscillation of the oscillation portion with respect to the substrate in the direction of the Y-axis, in cooperation with the detection portion;
a first servo control circuit forming a first servo control signal, based on the signal inputted from the retrieval circuit indicating oscillation of the oscillation portion in the direction of the Y-axis and a signal inputted from the drive circuit synchronous with oscillation of the oscillation portion caused by the angular rate, the first servo control signal being outputted to the servo portion to restrain oscillation of the oscillation portion in the direction of the Y-axis;
a second servo control circuit forming a second servo control signal, based on the signal that is inputted from the retrieval circuit and indicates oscillation of the oscillation portion in the direction of the Y-axis and a signal that is inputted from the drive circuit and is synchronous with the cross talk of the oscillation portion in the direction of the Y-axis caused by the driving thereof, the second servo control signal being supplied to the servo portion to restrain cross talk; and
an output circuit outputting a signal corresponding to the first servo control signal as a signal indicative of the angular rate.

26. The angular rate detecting device according to claim 25, wherein:
the first servo control circuit comprises:
a first reference signal forming circuit controlling the amplitude of the signal inputted from the drive circuit synchronous with oscillation of the oscillation portion caused by the angular rate and forming a first reference signal of a predetermined amplitude;
a first synchronous detection circuit synchronously detecting the retrieved signal indicative of oscillation of the oscillation portion in the direction of the Y-axis with the signal inputted from the drive circuit synchronous with oscillation of the oscillation portion caused by the angular rate, the first synchronous detection circuit forming the first servo control signal proportional to a magnitude of oscillation of the oscillation portion in the direction of the Y-axis caused by the angular rate; and
a first servo control signal supplying circuit controlling the amplitude of the first reference signal in accordance with the first servo control signal and supplying the servo portion with the amplitude-controlled first reference signal to restrain oscillation of the oscillation portion in the direction of the Y-axis caused by the angular rate, and wherein the second servo control circuit comprises:
a second reference signal forming circuit controlling the amplitude of the signal inputted from the drive circuit synchronous with cross talk of the oscillation portion caused by the driving thereof, the second reference signal forming circuit forming a second reference signal of a predetermined amplitude;
a second synchronous detection circuit synchronously detecting the retrieved signal indicative of oscillation of the oscillation portion in the direction of the Y-axis with the signal inputted from the drive circuit synchronous with cross talk of the oscillation portion caused by the driving thereof, wherein the second synchronous detection circuit forms a second servo control signal proportional to the magnitude of oscillation of the oscillation portion in the direction of the Y-axis caused by the driving thereof; and
a second servo control signal supplying circuit controlling the amplitude of the second reference signal in accordance with the second servo control signal and supplying the servo portion with the amplitude-controlled second reference signal to restrain oscillation of the oscillation portion in the direction of the Y-axis caused by the driving thereof, and wherein the output circuit outputs the first servo control signal as a signal indicative of the angular rate.

27. The angular rate detecting device according to claim 26, further comprising an abnormality judging circuit coupled to a downstream side of a path of a signal indicative of oscillation of the oscillation portion in the direction of the Y-axis, the abnormality judging circuit supplying an upstream portion of the path with a dummy signal of a predetermined frequency, wherein the abnormality judging circuit superposes the dummy signal onto the signal indicative of oscillation of the oscillation portion in the direction of the Y-axis and judges whether there is an abnormality in the path based on whether the dummy signal is received.

28. The angular rate detecting device according to claim 25, further comprising an abnormality judging circuit coupled to a downstream side of a path of a signal indicative of oscillation of the oscillation portion in the direction of the Y-axis, the abnormality judging circuit supplying an upstream portion of the path with a dummy signal of a predetermined frequency, wherein the abnormality judging circuit superposes the dummy signal onto the signal indicative of oscillation of the oscillation portion in the direction of the Y-axis and judges whether there is an abnormality in the path based on whether the dummy signal is received.

29. An angular rate detecting device comprising:

an oscillation portion connected to a substrate via a supporting member, the oscillation portion being oscillatable over the substrate in directions of an X-axis and a Y-axis, the X and Y axes being perpendicular to one another;

a drive portion causing the oscillation portion to oscillate with respect to the substrate in the direction of the X-axis;

a detection portion detecting oscillation of the oscillation portion with respect to the substrate in the direction of the Y-axis;

an angular rate detector detecting, based on oscillation of the oscillation portion in the direction of the Y-axis, an angular rate effective around a Z-axis, the Z-axis being perpendicular to both the X and Y axes, wherein the oscillation portion oscillates in the direction of the X-axis;

a servo portion restraining oscillation of the oscillation portion in the direction of the Y-axis;

a drive circuit causing the oscillation portion to oscillate with respect to the substrate in the direction of the X-axis with a predetermined amplitude, in cooperation with the drive portion;

a retrieval circuit for retrieving a signal indicative of oscillation of the oscillation portion with respect to the substrate in the direction of the Y-axis, in cooperation with the detection portion;

a first servo control circuit inputting from the drive circuit a signal synchronous with oscillation of the oscillation portion caused by the angular rate, and inputting from the retrieval circuit a signal indicative of oscillation of the oscillation portion in the direction of the Y-axis, wherein, based on the inputted signals, the first servo control circuit forms a first servo control signal restraining oscillation of the oscillation portion in the direction of the Y-axis in accordance with the angular rate and supplies the first servo control signal to the servo portion to restrain oscillation of the oscillation portion in the direction of the Y-axis in accordance with the angular rate;

a second servo control circuit inputting from the drive circuit a signal different in phase from the signal that is synchronous with oscillation of the oscillation portion caused by the angular rate, and inputting from the retrieval circuit a detection signal indicative of oscillation of the oscillation portion in the direction of the Y-axis, forming a second servo control signal which restrains an oscillation component of the oscillation portion in the direction of the Y-axis which component is synchronous with the signal different in phase, wherein the second servo control circuit supplies the formed second servo control signal to the servo portion to restrain the oscillation component of the oscillation portion in the direction of the Y-axis which component is synchronous with the signal different in phase; and an output circuit for outputting a signal corresponding to the first servo control signal as a signal indicative of the angular rate.

30. The angular rate detecting device according to claim 29, wherein the signal different in phase is different by 90 degree from the phase of the signal synchronous with the oscillation caused by the angular rate.

31. The angular rate detecting device according to claim 30, further comprising an abnormality judging circuit coupled to a downstream side of a path of a signal indicative of oscillation of the oscillation portion in the direction of the Y-axis, the abnormality judging circuit supplying an upstream portion of the path with a dummy signal of a predetermined frequency, wherein the abnormality judging circuit superposes the dummy signal onto the signal indicative of oscillation of the oscillation portion in the direction of the Y-axis and judges whether there is an abnormality in the path based on whether the dummy signal is received.

32. The angular rate detecting device according to claim 29, further comprising an abnormality judging circuit coupled to a downstream side of a path of a signal indicative of oscillation of the oscillation portion in the direction of the Y-axis, the abnormality judging circuit supplying an upstream portion of the path with a dummy signal of a predetermined frequency, wherein the abnormality judging circuit superposes the dummy signal onto the signal indicative of oscillation of the oscillation portion in the direction of the Y-axis and judges whether there is an abnormality in the path, based on whether the dummy signal is received.

* * * * *